(12) United States Patent
Baker

(10) Patent No.: US 9,578,046 B2
(45) Date of Patent: Feb. 21, 2017

(54) ANALYSIS OF TIME SERIES DATA

(71) Applicant: MTS CONSULTING PTY LIMITED, Sydney (AU)

(72) Inventor: Michael Baker, Sydney (AU)

(73) Assignee: Arbor Networks, Inc., Burlington, MA (US)

( * ) Notice: Subject to any disclaimer, the term of this patent is extended or adjusted under 35 U.S.C. 154(b) by 0 days.

(21) Appl. No.: 14/405,684

(22) PCT Filed: Aug. 9, 2013

(86) PCT No.: PCT/AU2013/000883
§ 371 (c)(1),
(2) Date: Dec. 4, 2014

(87) PCT Pub. No.: WO2014/026220
PCT Pub. Date: Feb. 20, 2014

(65) Prior Publication Data
US 2015/0156213 A1    Jun. 4, 2015

Related U.S. Application Data

(60) Provisional application No. 61/682,657, filed on Aug. 13, 2012.

(51) Int. Cl.
*H04L 29/06* (2006.01)
(52) U.S. Cl.
CPC ................. *H04L 63/1416* (2013.01)
(58) Field of Classification Search
CPC combination set(s) only.
See application file for complete search history.

(56) References Cited

U.S. PATENT DOCUMENTS

| | | | |
|---|---|---|---|
| 6,931,400 B1* | 8/2005 | Indyk | G06F 17/30548 |
| 9,473,178 B2* | 10/2016 | Shastry | H03M 13/353 |
| 2002/0049742 A1* | 4/2002 | Chan | G06F 17/3087 |
| 2003/0039408 A1* | 2/2003 | Smith | H04N 19/172 382/298 |
| 2005/0039086 A1* | 2/2005 | Krishnamurthy | H04L 41/142 714/57 |
| 2006/0047807 A1* | 3/2006 | Magnaghi | H04L 63/1458 709/224 |

(Continued)

*Primary Examiner* — Taghi Arani
*Assistant Examiner* — Phy Ang Vu
(74) *Attorney, Agent, or Firm* — Locke Lord LLP; Scott D. Wofsy; Christopher J. Capelli

(57) ABSTRACT

The systems and methods described herein relate to storing values, such as sketches, that represent time indexed data related to network traffic. The model may be indexed by multiple sets of keys and time range values. It is an advantage that the index is essentially repeated for different time intervals. Utilization of the sketches avoids prohibitively large amounts of network traffic from overwhelming the monitoring computing device(s). Further, the probabilistic representative accuracy of the sketches is dynamically configurable. The time indexed data may represent data traffic on a computer network. The time indexed data may be data packets sent on the network. In one or more embodiments the time indexed data may be sketches that represent and/or approximate the data packets. Further, it is contemplated herein that the accuracy of the sketches' representation may be dynamically configurable.

19 Claims, 27 Drawing Sheets

(56) References Cited

U.S. PATENT DOCUMENTS

| | | | | |
|---|---|---|---|---|
| 2007/0055477 | A1* | 3/2007 | Chickering | G06K 9/00503 702/182 |
| 2007/0283436 | A1* | 12/2007 | Duffield | H04L 63/1425 726/23 |
| 2008/0056487 | A1* | 3/2008 | Akyol | H04L 63/0428 380/2 |
| 2008/0180382 | A1* | 7/2008 | Hao | G06Q 40/02 345/100 |
| 2008/0306896 | A1* | 12/2008 | Dash | G06F 19/3493 706/52 |
| 2009/0063432 | A1* | 3/2009 | Aggarwal | G06K 9/00979 |
| 2010/0027432 | A1* | 2/2010 | Gopalan | H04L 41/142 370/252 |
| 2010/0058469 | A1* | 3/2010 | Yen | H04L 63/1416 726/22 |
| 2010/0305806 | A1* | 12/2010 | Hawley | G07C 5/008 701/31.4 |
| 2011/0255424 | A1* | 10/2011 | Nelson | H04L 43/18 370/252 |
| 2012/0063641 | A1* | 3/2012 | Venkatesh | G06K 9/00771 382/103 |
| 2013/0064096 | A1* | 3/2013 | Degioanni | H04L 67/1097 370/241 |
| 2014/0189861 | A1* | 7/2014 | Gupta | H04L 63/08 726/22 |
| 2015/0088798 | A1* | 3/2015 | Ghosh | G06Q 10/04 706/46 |
| 2015/0373043 | A1* | 12/2015 | Wang | G06F 21/552 706/12 |
| 2016/0191547 | A1* | 6/2016 | Zafar | H04L 63/1416 726/23 |
| 2016/0191549 | A1* | 6/2016 | Nguyen | G06F 11/00 726/23 |
| 2016/0191551 | A1* | 6/2016 | Beauchesne | G06F 11/00 726/23 |
| 2016/0234167 | A1* | 8/2016 | Engel | H04L 63/0245 |

* cited by examiner

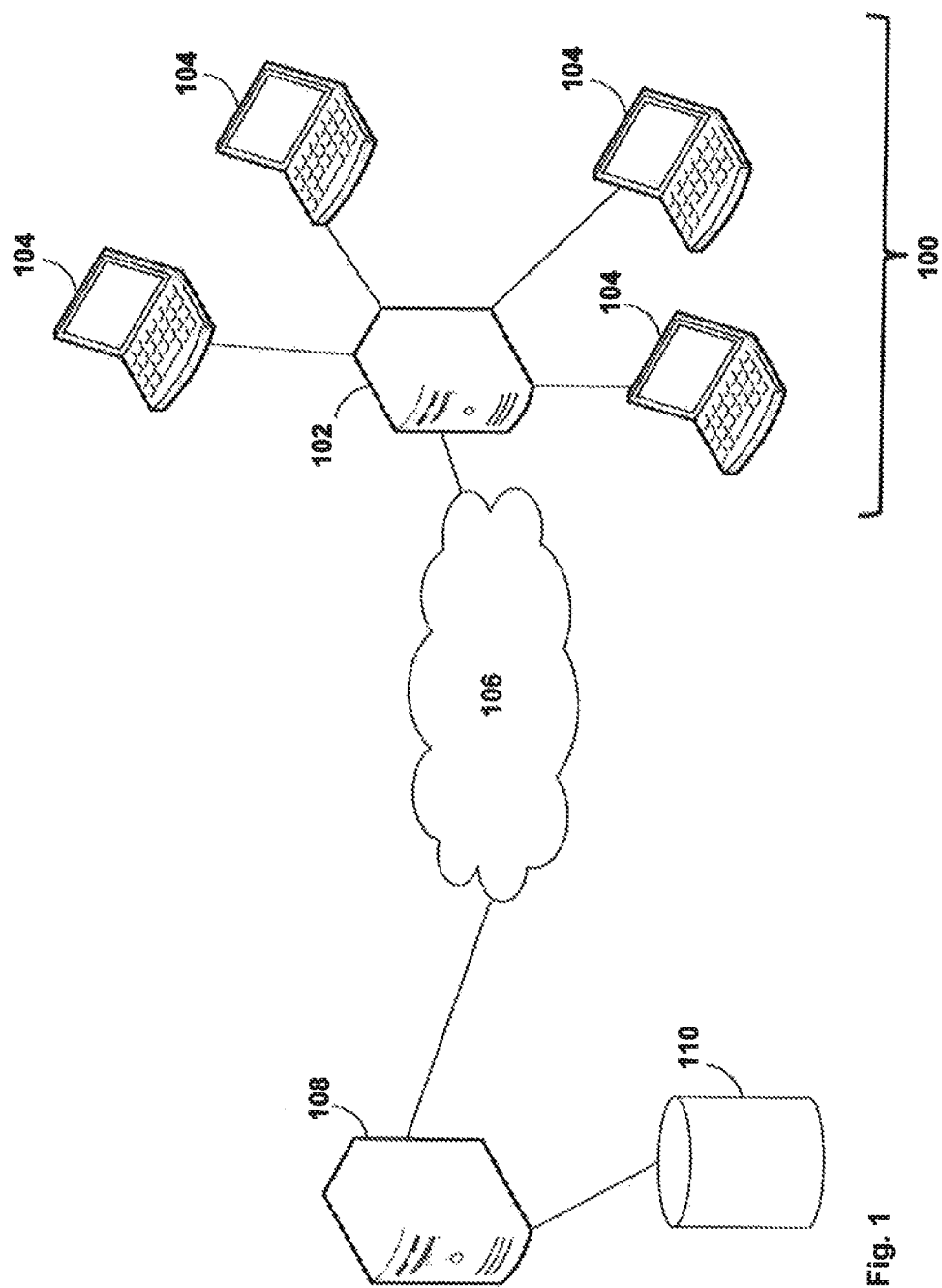

BINS' Database Table

| Row | 1312588800 | 1312588860 | 1312588920 | 1312588980 | 1312589040 | 1312589100 | 1312589160 | 1312589220 | 1312589280 | 1312589340 | 1312589400 | 1312589460 | 1312589520 | 1312589580 | 1312589640 |
|---|---|---|---|---|---|---|---|---|---|---|---|---|---|---|---|
| all:all:all:1:188.20.1:any:192.168.10.2:any:snort_3:days:1 | 1 | | | | | | | | | | | | | | |
| all:all:all:1:any:any:COFR:snort_sig_1_402_8:days:1 | 1 | | | | | | | | | | | | | | |
| all:all:2:COUS:0:any:any:snort_sig_1_366_7:days:1 | 1 | | | | | | | | | | | | | | |
| all:all:all:1:any:any:192.168.1.70:any:attacks_3:months:1 | | | | | | | | | | | | | | | |
| all:all:all:1:AS27382:any:any:any:attacks_all:days:1 | 1 | | | | | | | | | | | | | | |
| 1:1:1:1:any:any:COFR:any:snort_3:days:1 | | | 5 | 1 | 2 | 7 | | | | | | | | | |
| 1:1:1:1:192.160.69.100:any:any:snort_all:minutes:1 | 5 | | | | | 7 | | | | | | | | | |
| 1:1:all:2:AS45629:0:any:any:snort_sig_1_384_5:minutes:5 | 7 | | | | | | | | | | | | | | |
| 1:1:1:1:any:any:snort_sig_1_384_5:minutes:15 | 22 | | | | | | | | | | | | | | |
| 1:1:1:1:any:any:any:snort_3:minutes:5 | 9 | | | 1 | | | | | | | | | | | |
| 1:1:1:1:12:any:0:snort_all:minutes:1 | 3 | 1 | 5 | 8 | 5 | 23 | 43 | 2 | 7 | 18 | 22 | 83 | 56 | 12 | 1 |
| 1:all:all:2:COTH:any:snort_3:hours:8 | 1 | | | | | | | | | | | | | | |
| 1:all:2:AS27382:any:any:any:attacks_3:years:1 | 1 | | | | | 2 | | | 1 | | | | | | |
| all:all:1:any:192.168.1.1:snort_sig_1_402_7:minutes:1 | | 2 | 1 | | | 2 | 1 | | | | 1 | | | 1 | 1 |
| 1:1:1:1:AS6930:0:any:any:snort_sig_1_402_8:minutes:1 | 1 | | | 12 | 6 | 9 | | | | | 12 | | | | |
| 1:all:1:any:any:CIUSMACoha:sset:any:attacks_3:months:1 | 1 | | | | | | 65 | | 2 | | | | | | |
| 1:1:1:1:AS27382:any:any:any:attacks_3:minutes:1 | | | | 17 | 5 | 23 | 2 | | | | | 2 | | | |
| 1:1:all:2:any:any:attacks_all:minutes:1 | 3 | 1 | | 8 | 5 | | | | | 18 | | | | 1 | 1 |

Sat Aug 6 10:00:00 2011 → Sat Aug 6 10:15:00 2011

1 minute • 5 minutes • 15 minutes

| BINS' Database Table | 1312588800 | 1312588860 | 1312588920 | 1312588980 | 1312589040 | 1312589100 | 1312589160 | 1312589220 | 1312589280 | 1312589340 | 1312589400 | 1312589460 | 1312589520 | 1312589580 | 1312589640 |
|---|---|---|---|---|---|---|---|---|---|---|---|---|---|---|---|
| all:all:all:1:188.20.1:any:192.168.10.2:any:snort_3:days:1 | SK | | | | | | | | | | | | | | |
| all:all:all:1:any:any:COFR:snort_sig_1_402_8:days:1 | SK | | | | | | | | | | | | | | |
| 1:1:all:2:COUS:0:any:any:snort_sig_1_366_7:days:1 | SK | | | | | | | | | | | | | | |
| all:all:all:1:any:any:192.168.1.70:any:attacks_3:months:1 | SK | | | | | | | | | | | | | | |
| all:all:all:1:AS27382:any:any:any:attacks_all:days:1 | SK | SK | SK | | | | | | | | | | | | |
| 1:1:1:1:any:any:COFR:any:snort_3:days:1 | SK | SK | SK | | SK | SK | | | | | | | | | |
| 1:1:1:192.160.69.100:any:any:any:snort_all:minutes:1 | SK | SK | SK | | | | SK | | | | | SK | | | |
| 1:1:all:2:AS45629:0:any:any:snort_sig_1_384_5:minutes:5 | SK | SK | SK | | SK | SK | SK | SK | | | SK | | SK | | |
| 1:1:1:1:AS45629:0:any:any:snort_sig_1_384_5:minutes:15 | SK | SK | SK | SK | SK | SK | SK | SK | SK | SK | | | | SK | |
| 1:1:1:any:0:any:snort_3:minutes:5 | SK | SK | SK | | SK | SK | SK | SK | SK | | | | SK | SK | SK |
| 1:1:12:any:0:any:snort_all:minutes:1 | SK | SK | | | SK | SK | SK | SK | | | SK | | | | |
| 1:all:all:1:any:any:snort_3:hours:8 | SK | SK | SK | | | SK | SK | SK | | SK | | | | | |
| all:all:all:2:AS27382:any:any:any:attacks_3:years:1 | SK | SK | SK | | | SK | | | | | | | SK | SK | SK |
| all:all:all:1:any:192.168.1.1:snort_sig_1_402_7:minutes:1 | SK | SK | SK | | | | | | | | SK | | | | |
| 1:1:1:1:AS6930:0:any:any:snort_sig_1_402_8:minutes:1 | SK | SK | SK | SK | | | | | | SK | | | SK | SK | SK |
| all:all:all:1:any:any:CUSMACohasset:any:attacks_3:months:1 | SK | SK | | | | | | | | | | | | | |
| 1:all:1:any:any:any:any:attacks_3:minutes:1 | SK | SK | SK | | | | | | | SK | | | | | SK |
| 1:all:2:any:any:any:attacks_all:minutes:1 | SK | | | | | | | | | | | | | | |

SK = Sketch

Groupings' Database Table

| | 1 | 2 | 3 | 4 | 80 | 1302 |
|---|---|---|---|---|---|---|
| | 192.168.1.1 | 192.168.1.2<br>192.168.1.3 | 192.168.1.4 | 192.168.1.52 | 192.168.1.69 | ... |
| 1:1:all:1:sig_dst:snort_all:minutes:1:1249081380 | 37830<br>49523<br>39778<br>52275 | 54730 | 6977 | 4546<br>5500 | 1787 | ... |
| all:all:all:1:sig_dport:snort_sig_1_1394_12:minutes:15:1249083900 | | | | | | 7331 |
| 1:all:all:3:sig_srcdst:snort_sig_1_304_5:minutes:5:1249062300 | | | | | | 192.168.1.1,192.168.1.2 |
| 1:all:all:1:any_sig:any:minutes:5:1249082100 | | | | | | snort_sig_1_402_8<br>snort_sig_1_368_6 |

| Data Summary | Summary | Top Sources | TOP Destinations | TOP Attacks/Port | | |
|---|---|---|---|---|---|---|
| Attacks | | Trend | | Severity | | Attack Types |
| Attacks per 1m | | Daily Trend | High severity attacks | | | New attack types |
| 9.0 | Company Average 451.00 -(<=99x) Global Average 3065.00 -(-99x) | | 1 | Company Average 1.00 -(0%) Global Average 9.00 -(-100%) | | 3 |
| Difference to previous | | Monthly Trend | Medium severity attacks | | | District attack types |
| 100% | % Total attacks 100% | | 12 | Company Average 109.00 -(<-99x) Global Average 686.00 -(<-99x) | | 7 |
| Total attacks | | Yearly Trend | Low severity attacks | | | Looped attack |
| 18 | Company Average 451.00 -(<=99x) Global Average 3065.00 -(<-99x) | ☐ | 6 | Company Average 341.00 -(<-99x) Global Average 2370.00 -(<-99x) | | 0 |

Fig. 11

| # | Summary | Top Attacks | New Attacks | Looped Attacks | Backchannels | | |
|---|---|---|---|---|---|---|---|
| | Attacks | | | | Chart | Count | % |
| 1 | ☀ ICMP Destination Unreachable Port Unreachable CVE-2005-0790 CVE-2005-0068 | | | | | 309 | 69% |
| 2 | ☀ stream5:TCP Small Segment Threshold Exceeded | | | | ▁▃▅▇█▅▃▁ | 97 | 22% |
| 3 | ☀ smtp:No memory available for decoding.Max Mime Mem exceeded. | | | | ▁▂▁ | 31 | 7% |
| 4 | ☀ stream5:Reset outside window | | | | ▁ | 10 | 2% |
| 5 | ☀ portscan:TCP Distributed Portscan | | | | ▁ | 1 | 0% |
| 6 | ☀ portscan:TCP Portscan | | | | ▁ | 1 | 0% |
| 7 | ☀ smtp:Attempted command buffer overflow CVE-2005-0560 CVE-2001-0260 | | | | ▁ | 1 | 0% |

Fig. 12

| Datatype | Group By | Interval (Bin) | Start Timestamp | End Timestamp | Time Range | Objects Returned |
|---|---|---|---|---|---|---|
| src | attacks_all | days:1 | Mon Jun 01 1998 10:00:00 GMT+1000 (EST) | Mon Aug 03 1998 10:00:00 GMT+1000 (EST) | 3 months | 4 |

Fig. 19

| Datatype | Group By | Interval (Bin) | Start Timestamp | End Timestamp | Time Range | Objects Returned |
|---|---|---|---|---|---|---|
| attacks_1 | (no grouping) | days:1 | Mon Jun 01 1998 10:00:00 GMT+1000 (EST) | Mon Aug 03 1998 10:00:00 GMT+1000 (EST) | 3 months | 3 |

Fig. 20

| Datatype | Group By | Interval (Bin) | Start Timestamp | End Timestamp | Time Range | Objects Returned |
|---|---|---|---|---|---|---|
| attacks_2 | (no grouping) | days:1 | Mon Jun 01 1998 10:00:00 GMT+1000 (EST) | Mon Aug 03 1998 10:00:00 GMT+1000 (EST) | 3 months | 3 |

Fig. 21

| Datatype | Group By | Interval (Bin) | Start Timestamp | End Timestamp | Time Range | Objects Returned |
|---|---|---|---|---|---|---|
| attacks_3 | (no grouping) | days:1 | Mon Jun 01 1998 10:00:00 GMT+1000 (EST) | Mon Aug 03 1998 10:00:00 GMT+1000 (EST) | 3 months | 4 |

Fig. 22

ANALYSIS OF TIME SERIES DATA

CROSS-REFERENCE TO RELATED APPLICATIONS

The present application claims priority from PCT/AU2013/000883, filed Aug. 9, 2013, with the Australian Patent office, which claims priority from U.S. Provisional Patent Application No. 61/682,657 filed on 13 Aug. 2012, the contents of each of which are incorporated herein by reference.

FIELD OF THE INVENTION

This disclosure concerns the analysis of time series data. For example, but not limited to, the analysis of the data packets sent on a computer network in order to identify security risks. Aspects include a data model, methods, software, user interfaces and a computer system.

BACKGROUND OF THE INVENTION

Current market solutions for identifying security risks on a computer network analyze text-based log information and aggregate this information into a system called Security Information and Management (SIEM) system. These logs are text-based summaries of the data sent on the network. These centralised logging systems generally leverage Relational Database Management Systems (RDBMS). As the size of the logs grows, the logs themselves are also abstracted and aggregated further to make the data efficiently processable.

Other solutions that process network packet captures (PCAPs) use point solutions (tools) that are generally grouped into the Digital Forensics/Incident response.

SUMMARY OF THE INVENTION

The purpose and advantages of the below described illustrated embodiments will be set forth in and apparent from the description that follows. Additional advantages of the illustrated embodiments will be realized and attained by the devices, systems, and methods particularly pointed out in the written description and the claims herein, as well as from the drawings.

In a first aspect there is provided a computer readable medium having stored thereon a computer readable data model to store values, such as sketches, representing time indexed data, wherein the model is indexed by multiple sets of keys wherein each key in a set includes the same set of criteria related to the time indexed data, and each key of the set represents a different time interval length.

It is an advantage that the index is essentially repeated for different time intervals. This enables access to the time indexed data for display on a user interface in a manner that can adapt to changes in the resolution of the time indexed data needing to be displayed (e.g., zoomed in or out) without the need or with limited further processing of the stored data.

The time indexed data may represent data traffic on a computer network. The time indexed data may be data packets sent on the network. In one or more embodiments the time indexed data may be sketches that represent and/or approximate the data packets. Further, it is contemplated herein that the accuracy of the sketches' representation may be dynamically configurable. Additionally, it is to be appreciated the sketches may preferably relate to Frequency, Distinct Values and Top N events where N is a category (such as Countries) whereby it is desired they are returned in descending order. In addition, sketches may be used for frequency, distinct values and Top N to provide analytics on threats, packets, protocols, malware or other threat information.

The stored time indexed data may be processed to identify security risks in the data traffic.

The criteria may relate to features in the time indexed data that separately or together with other features are indicators of security risks in the data traffic.

The computer readable data model may be further indexed by a second index comprised of time values represented in the time series data.

A first key represents a first time interval length and a second key in the same set as the first key represents a second time interval, wherein the second time interval length is larger than the first time interval length and the values stored in the data model for the second key summarizes the values stored in the data model for the first key.

Alternatively, the computer readable data model may be further indexed by a second index that represents a count or total.

A criteria of each key of a set may be a time value represented in the time series data.

Where appropriate, one or more of the method aspects described above may be combined. The same applies to the computer system, user interface and software aspects.

Where appropriate, optional features of any aspect described here are also optional features to the other aspects of the embodiments outlined herein.

BRIEF DESCRIPTION OF THE DRAWINGS

An example will now be described with reference to the accompanying drawings in which:

FIG. 1 is an example simplified hardware computer system that can be used with the system of this example;

FIG. 5 are sample portions of exemplary bins databases;

FIG. 7 is a sample portion of a groupings database;

FIGS. 10 to 17 is a set of example user interface or part of example user interfaces;

FIGS. 19 to 22 schematically show two queries to the databases.

DETAILED DESCRIPTION OF CERTAIN EMBODIMENTS

Figure 2A:
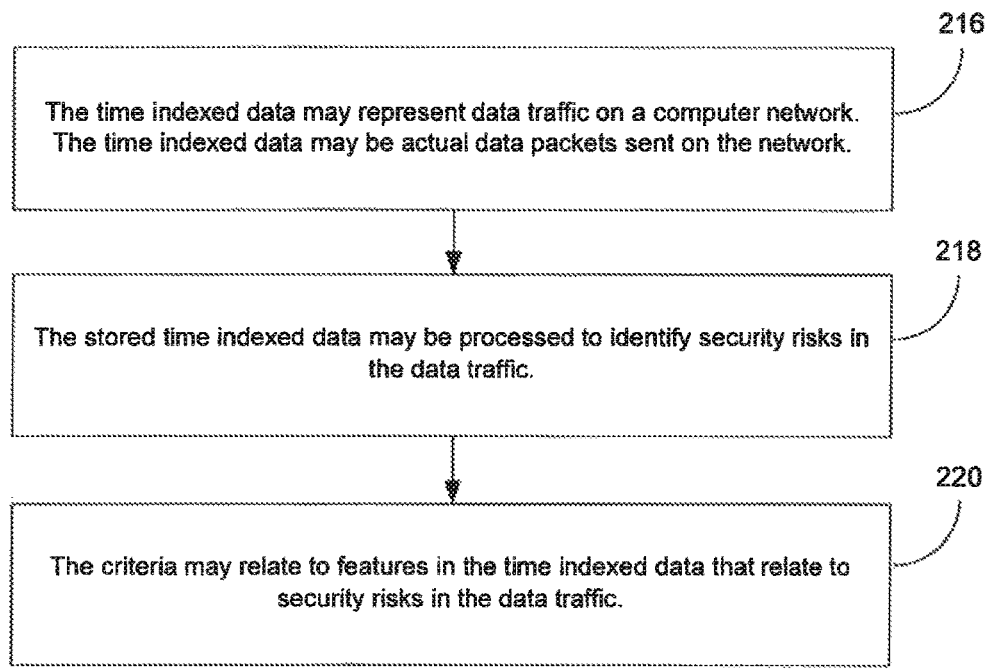
FIG. 2 are flow charts of the methods of the system.

It is to be appreciated the below illustrated embodiments are not limited in any way to what is shown, as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the certain illustrated embodiments. Also, the flow charts and methods described herein do not imply either required steps or a required order to the steps, and it is contemplated herein that the illustrated embodiments and processes may be implemented in any order and/or combination that is practicable.

Unless defined otherwise, all technical and scientific terms used herein have the same meaning as commonly understood by one of ordinary skill in the art relating to the below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" may include a plurality of such stimuli and reference to "the signal" may include reference to one or more signals and equivalents thereof as known to those skilled in the art.

It is to be appreciated the certain embodiments described herein may be utilized in conjunction with a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be executed by a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the certain embodiments described herein. Thus the certain embodiments are not to be understood to be limited by what has been particularly shown and described, except as indicated by the appended claims.

In this example, the time series data is data from a network that is analyzed to identify potential security risks.

Referring to the simplified drawing of FIG. 1, a network 106 is typically a privately owned computer network. It typically includes one or more servers 102 that support multiple users 104, each accessing the network using one or more devices. The server 102 supports processing and communications between the users 104 and also between each user 104 and the server 102. A person skilled in the art would readily understand that many forms of the network 106 exist, such as distributed networks, LANs and WANs, publically owned, cloud orientated networks etc. All of these networks are included in the definition of a network as used in this specification.

In this example the server 102 is in communication with the security analysis service stored in computer readable medium hosted by server 108. Again, the server 108 is simply one example of the hardware computing devices that could be used to support this system. Many other distributed network, cloud orientated networks could be used to support this service. It is to be appreciated the security analysis server (108) listens to all traffic on the network (106). If systems like 104 connect directly to the network (106), that is acceptable. If they have to route through 102 as a wireless router or other type of router, that is acceptable. However as soon as the traffic passes over the network being tapping then traffic is observed, hence there is no reliance on server 102 or user 104 to send information to a security analysis server directly.

In this example, system is used to assess the security risks on the network 106 over a period of time, such as one month. Network packet captures (PCAPs) are binary files that are an exact replica of the network traffic on the network 106 for the duration of the capture. That is, all data packets sent to and from the server 102 in the one month.

In one embodiment, an administrator of the network 106 interacts with a web interface hosted by the server 108 to upload these PCAPs to the system and these are stored in a datastore 110, such as a database. Alternative methods for uploading PCAPs include using Secure File Interface, Secure File Transfer Protocol or copied from a Customer's Amazon S3 Bucket. Network packet captures can also be streamed from a sensor located on the network 106 to server 108 to be stored by the server 108 on the database 110 for persistence. This implementation is known as a software service that is located in the cloud as the processing of the PCAPs is batched processed by a remotely located server 108. It is to be appreciated that batch processing is to be understood to be when Users upload packet capture (PCAP) files for processing. Live or real time processing happens when our Virtual Machine or Physical appliance taps the network directly and processes the network data in real time.

The server 108 includes software to support the security risk analysis methods described here, including software to host the user interface, to manage the databases described further below, the software of the IPS Engines and map reduce jobs etc. A person skilled in the art would also understand that the server 108 includes the necessary hardware components required to execute the methods described here, such as a processor, input/output port, RAM and ROM memory and hardware to support the datastore 110. It is to be also be appreciated that server 108 can also be a cluster over computers.

Again, while the database 110 is shown as being local to the server 108 a person skilled in the art would readily understand that there are many ways that the server 108 (or collection of servers) could access the data when stored in an alternative way, such as distributed and remotely commonly referred to as on the cloud.

Since packet captures are an exact copy in binary format we can use it as a prima facie data source for Threats (Network Attacks), Sessions (IP, TCP, UDP, ICMP), Protocols, (HTTP, SSH, IMAP) and Files (Word, Excel, PDF, malware and/or shellcode).

The system of this example iteratively analyzes the PCAPs to look for anomalies. The system can dissect the traffic and perform deep packet inspection in relation to protocols conveyed in the packet capture. All files that are conveyed within the packet capture can be extracted and analyzed for anomalies, viruses or compared to a whitelist or blacklist. The analysis can be repeated based on new information to identify previously unidentified security risks.

It is further contemplated herein that the user interface may reflect live (real-time) traffic that is being communicated across a computer network, and/or the user interface may reflect historical data (non-live) computer network traffic. For non-live traffic, the data can be animated and portrayed in the user interface as if it were live, and such data may be paused, rewound, and/or fast-forwarded. If live traffic is being portrayed in the user interface, such data may be paused and/or rewound, and thus, the user interface presents the ability to easily transition from viewing live to non-live data (or vice versa). Further, in one or more embodiments, the advanced search filters and/or time ranges may be applied to the live and/or non-live data.

Figure 4:
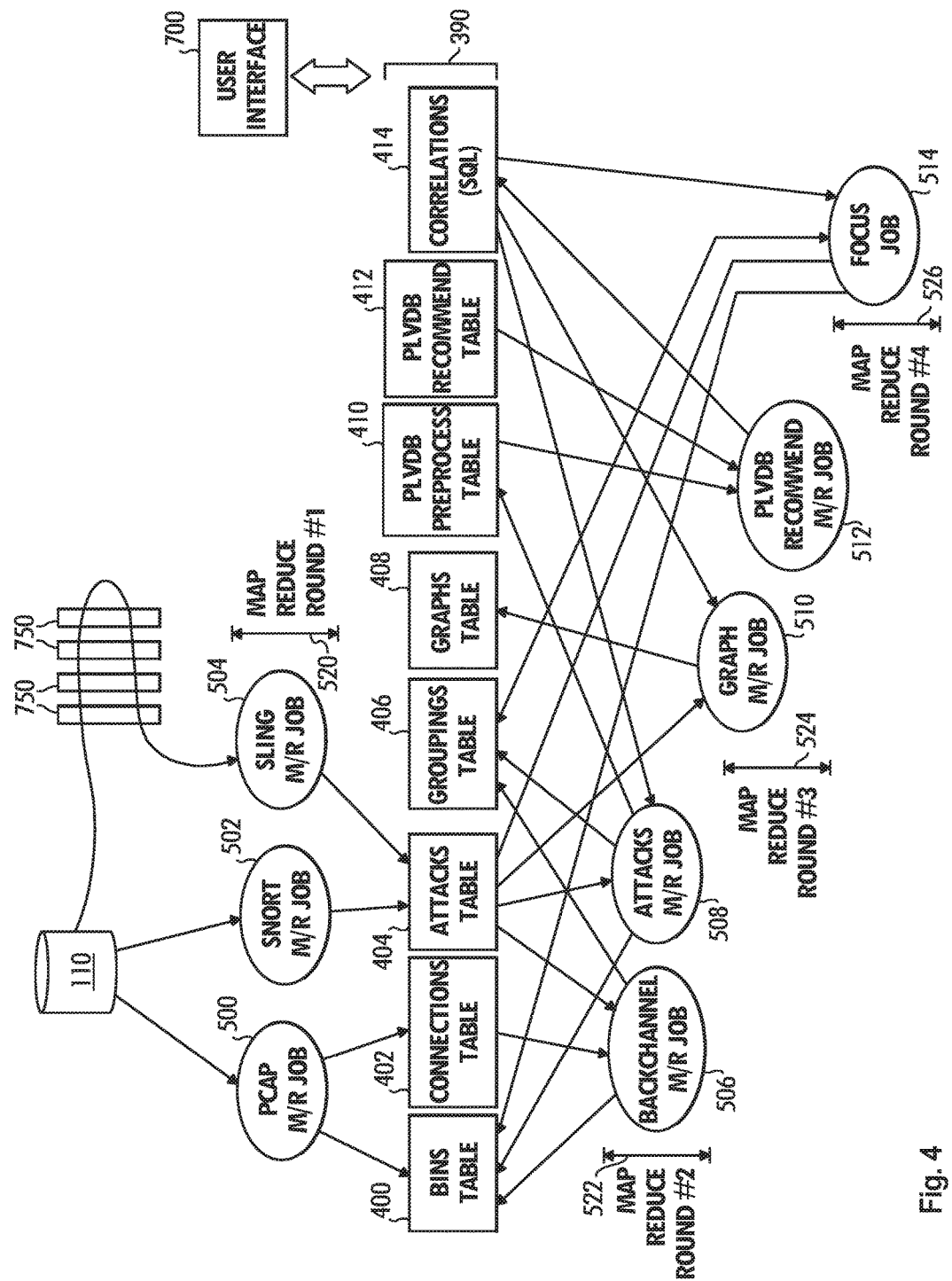
FIG. 4 schematically shows exemplary relationships between stored network traffic, map/reduce jobs, IPS Engines and the user interface.

The aim of the security risk analysis is to identify trends, issues, anomalies, misuse, rates of change and relationships between any node on the network 106 at any point of time. It does this by analyzing and persisting large volumes of PCAPs. An illustrative design of the system is schematically shown in FIG. 4 (which it he present invention is not to be understood to be limited to). The use of a parallel processing model allows the system to be readily scalable. Each process performed by the system in this example is executed using the Map/reduce model and the java based software system Hadoop. For example, feature extraction for Statistical analysis and Machine Learning can be performed. As will be described further, anomalies and misuse can be identified using custom map/reduce jobs or by Snort and Sling map/reduce jobs to use sensors that produce alerts. A person skilled in the art would also identify that other parallel processing architectures are suitable for use with the system. For instance, other embodiments may use a complex event processing (CEP) engine allowing batch or real time processing The map/reduce jobs 500-514 breaks up and analyses the PCAPs, and in this case in rounds, so as to produce results that are inserted into databases 390.

The map/reduce jobs 500-514 query the PCAPs stored on the datastore 110 and perform both real-time and batch inserts into (with or without querying) a distributed database, which is essentially a number of databases 390 stored typically at multiple distinct physical locations. Real-time insertions provide sub-second information based on network traffic of the network. Batch insertions are performed as the outcome of map/reduce jobs written to execute on a Hadoop Cluster. Batch insertions are generally used for jobs that are required to look at the entire dataset rather than a stream of network data.

A person skilled in the art would understand that many distributed database schemes could be used in this system, including maintaining duplicate copies of one or more databases. Databases 400-412 are column orientated and database 414 is a relational database. The word database should be understood here to mean one or more tables that may or may not separately be part of a database management system.

Example databases 390 are shown in FIG. 4 are:
Bins database 400 having sparse time series data to record row keys over time
Connections database 402 being an intermediary table to track IP connections such as TCP connections and UDP/ICMP pseudo connections
Attacks database 404 having data related to security risks (attacks)
Groupings database 406 being an inverted index that correlates counts and values to row keys
Graphs database 408 being a network graph made up of Nodes, Properties and Edges that persist relationships between structured and unstructured data from Threats, Sessions, Protocols and Files
PLVDB Preprocess database 410 being a vulnerability database pre-processing
PLVDB Recommend database 412 having recommendations for attack related information and correlated signatures
Correlations table 414 being a SQL table that allows Signatures to be grouped in the user interface and then be processed by the PLVDB Recommend job 512 for insertion into PLVDB Recommend table 412
Bins Table 400

For ease of illustration, a subset of an example bins database 400 is shown in FIG. 5.

The data model of the exemplary bins database 400 is comprised of billions of columns 550 at 60 second time values boundaries or time value intervals using unix timestamps (e.g. 1312610400 equates to Sat Aug 6 16:00:00 2011, here the timestamps are UTC (Universal time Co-ordinated and a relevant time zone adjustment can be applied). So using this example there would be a column named 1312610400 and the next would be 1312610460. That is, each column represents 60 seconds in the PCAPs. This provides the default minimum resolution period of 60 seconds (1 minute).

A person skilled in the art would understand that this minimum resolution is readily customisable and could be made less than 60 seconds. For example, the columns could each represent 15 seconds or 5 seconds each using the unix time stamp as columns names.

Although the smallest bin of time in this example is 60 seconds (a minute bin), many bin periods are concurrently stored for each key. In this example, the bin time length intervals are:
  Minute Bins—1 minute, 5 minutes, 15 minutes
  Hour Bins—1 hour, 6 hours
  Day Bins—1 day, 7 days
  Month Bins—1 month, 6 months
  Year Bins—1 year
These time bins provide the user with the ability to zoom in and out on in the analysis of the PCAPs in relation to time using the user interface 700. That is, the analysis can be seen at an overview level by displaying a visualization of the 1 year bin and also zoomed all the way in to the actual minute that the data happened. The general method of operation is shown in FIG. 2(*a*).

The use of multiple bin widths means that, in one embodiment, the PCAPs are not abstracted and nor is there any loss of information related to the data over time (limited only by the minimum resolution in the columns). At the same time the model of the bins database also allows for management of how much data is sent to the user interface 700 for display by selecting the appropriate bin for the display and preventing excessive processing of data for display post extraction from the databases 390.

As a result the bins database 400 may have an index that comprises of billions and billions of rows 552 that each define a set of criteria. Each row is typically a combination of criteria that the data within the PCAPs may meet. The rows are termed row keys as they provide a 'key' to data that is stored in the column that is termed the 'value'. By querying a row key for a particular column (time) we are able to return a value, in this case a count of how many times the PCAPs represented by that column meet the criteria of the relevant row key (best shown FIG. 5(*a*)). So a way we persist information from the parallel map/reduce jobs is to create sets of row keys for important combinations of criteria that we want to know the values of and then store the value in the appropriate column that represents the relevant time value range.

In the bins database 400, information about the data is concurrently stored multiple times depending on the bin width. For example a specific event (i.e. when the data matches a key) is written to all the related multiple time bins for that key concurrently.

Row keys define the criteria that is applied to the time series data of the PCAPs. This example bin database 400 row key comprises the following criteria separated by semicolons.

'user id' being the User ID of an user to separate network 106 data from others in the database. In this way, all users of the security analysis service that belong to network 106 are combined with reference to their user ID. At the same time any analysis that is based on global average would typically consider all user IDs captured 'device_id' being a Device ID for where the packet capture was taken or received from 'capture_id' being an identifier related to a specific packet capture file 'focus level' being the number of distinct sensor systems such as IPS Engines that detected an event, such as 1, 2, 3, 4

'src addr' being the source of the related data, such as Country, City, ISP, IP Address, ASN (Autonomous System Number)

'src_port' being the source port of the TCP or UDP communication

'dst addr' being the destination of the related data, such as Country, City, ISP, IP Address, ASN (Autonomous System Number)

'dst_port' being the destination port of the TCP or UDP communication

'type' being a way to aggregate data related to attacks, such as all attacks (attacks_all), high attacks (attacks_1), medium attacks (attacks_2), low attacks (attacks 3), snort_sig_1_2_3 (only that specific signature from a specific sensor)

'ts_interval' being whether the bin relates to minutes, hours, days, years

'ts amount' being an integer representing the multiple of the 'ts interval', such as 7 where the interval is 7 days and 'ts_interval' is days The combinations of a few criteria might produce a large number of row keys with data for a number of columns. For example a single attack detected by a map/reduce job such as attacks map/reduce job 508 (based on data produced by the snort 502 and sling 504 map/reduce jobs) might produce the following row keys and cause a value to be stored in the table for that row key at the specified column. These example row keys should be read "for row key"→Column→insert value For User '1' save the information into the 1 day bins for a view that shows all capture points
1:all:all:1:180.183.136.172:any:74.207.242.31:any:snort_3:days:1→1312588800→1
1:all:all:any:any:COFR:0:snort_sig_1_402_8:days:1→1312588800→1
1:all:all:AS27382:any:any:attacks_all:days:1→1312588800→1

For User '1' save the information into the 1 day bins for a specific capture point
1:1:all:1:180.183.136.172:any:74.207.242.31:any:snort_3:days:1→1312588800→1
1:1:all:1:any:any:COTH:0:snort_sig_1_402_8:days:1→1312588800→1
1:1:all:1:AS27382:any:any:attacks_all:days:1→1312588800→1

For all Users and Devices save a summary of the event into the 1 day bins
all:all:all:1:180.183.136.172:any:74.207.242.31:any:snort_3:days:1→1312588800→1
all:all:all:1:any:any:COTH:0:snort_sig_1_402_8:days:1→1312588800→1
all:all:all:1:AS27382:any:any:any:attacks_all:days:1→1312588800→1

As described above the 'source' and 'destination' can relate to a Country, City, ISP or IP Address. This is represented in row keys as shown by the following examples:
1:1:all:1:AS6939:any:any:any:attacks_3:years:1—where the Autonomous System Number is 6939
1:1:1:1:any:any:COFR:any:snort_3:days:1—where CO then two character country code FR is France.
all:all:all:1:CIUSMACohasset:any:any:any:snort sig_1 384_5:hours:6—where CI (City), US two character country code, MA two character state code and the city text Cohasset.

The map/reduce jobs process the PCAPs, enrich it (add context) and then insert the values into columns corresponding to bin widths. The row keys are constructed from over 10,000 different combinations of criteria found within a particular packet, or from correlating data within the packet with other information (e.g. location information). A person skilled in the art will appreciate that any kind of metadata can be extracted out of individual packets, multiple packets, and out of conversations, from which we can apply logic, statistical analysis or machine learning to this meta data or features for storage.

Bins may be packed/encoded as 64 bit Integers.

In one embodiment, the values in the bins may include sketches (best shown FIG. 5(*b*)). It is contemplated herein that the sketches may be calculated utilizing the Count-Min sketch algorithm, the HyperLogLog sketching algorithm, and/or any sketching algorithm and/or algorithm that generates probabilistic representations may be utilized as would be known and recognized by those skilled in the art. In this embodiment PCAPs are abstracted utilizing a sketching algorithm, and the resultant sketches are stored and utilized. It is contemplated herein that a given PCAP may relate to multiple sketches within one or more tables, and as such, that PCAP may result in several sketches being calculated, generated, and/or updated. The stored sketches may be kept in the BINS Database Table (see FIG. 5(*b*)) rather than the integer values in the time-stamped columns and the correlated PCAPs.

Further, because the representative accuracy of sketches is configurable, it is contemplated herein that the representative accuracy may be dynamically configurable. For example, a user of the systems and methods described herein may increase the representative accuracy of the sketches, such as after discovering that more accuracy is needed (e.g., for more accurate frequency, distinct value, or top n values). In another example, the computerized system may monitor its own resources (e.g., network usage, processor usage, hard drive usage) and adjust the representative accuracy based on those readings (e.g., if the computerized system is at risk of falling behind because of too many hard drive write requests, the representative accuracy of the sketches may be adjusted to compensate to alleviate that anticipated bottleneck). It is contemplated herein that the size of the original data being monitored will affect the size of the sketches that are needed for a given accuracy.

In one exemplary method of use, a model relating to network traffic is generated and displayed. The model may be indexed by a key (e.g., sets of keys) and time ranges, and one or more values in the model may be sketches. It is recognized herein that sketches may include any probabilistic representation as would be known by those skilled in the art.

A first instance of network traffic may be detected (e.g., step 216 in FIG. 2(*a*)), the network traffic having a time value that is consistent with one of the model's time ranges. A sketch is calculated, generated, and/or updated (e.g., a sketch was already in the model, and a second sketch is calculated and/or generated based at least on the network traffic and the previous sketch), and the sketch is stored in the model.

The model's one or more keys may include at least the other keys described herein (e.g., source IP address, source port, destination IP, destination port, source geography).

This process of generating, calculating, and/or updating sketches (e.g., probabilistic representations) may be iteratively and/or repeatedly practiced, and may be utilized to support real-time analysis of the sketches and/or retroactive analysis of the sketches.

Groupings Table 406

For ease of illustration, a subset of an example groupings table 406 is shown in FIG. 7.

The groupings database 406 data model does not use time series information for columns 700 but rather integers to store the current count or total for a row key. To produce information on issues such as the top 10 attackers, the groupings database can be directly obtained by querying the top columns for a row key 702 and then applying a limit to the set returned.

A row key 702 can comprise the following criteria separated by a delimiter, such as semicolons.
 'user id' as per the bins database 400
 'device_id' as per the bins database 400
 'capture_id' as per the bins database 400
 focus level being now many sensors recorded an alert on the same conversation with the same time value period
 data_type being information that can be grouped by the key
 key is aggregated data related to the 'type'
 'ts_interval' as per the bins database 400
 'ts_amount' as per the bins database 400
 'ts value' being the start time in the time series to query for integer values As can be seen from the above, the timestamp is part of a particular row key rather than a column (as in the bins database 400). Similarly to the bins database 400, each row keys represent unique combinations of values of the criteria so there are typically billons of rows 702. Again, row keys can be considered as sets of row keys having the same criteria of 'user_id', 'device_id', 'capture_id', 'focus_level', 'type', 'key and 'ts_value' but having a different value for the time interval, that is the combination of 'ts_interval' and 'ts_amount'.

Types of values stored in the groupings table 406 are dependent on the row key. For example, the row key could seek to identify IP Addresses that match the criteria of the row key. In this case, the values stored in that row will be IP Addresses in the appropriate column based on count. So if an IP Address satisfies the criteria for a row key a total of 4 times, it will be stored in the column representing the count 4. A different IP Address that satisfies the criteria for the same row key a total of 100 times will be entered in the column representing the count 100. Other data types stored in the groupings table 406 includes data representative of country, city, time, IPS signature ID, destination port and device, where all entries in a row are of the same data type.

A person skilled in the art will appreciate that many other forms of data can be stored in the groupings table 406.

In this example the groupings database does not store data within columns as plain text but rather packs the data into bytes as specific below.
Group Types (Column Values)
 Signature
 Signature+Port (can be source or destination port)
 Signature+IPV4 address
 Signature+IPV4 address+Port (currently source address+destination port, and destination address+destination port)
 Port (can be source or destination port)
 IPV4 address
 Two IPV4 addresses (for source and destination)
 Country
 Two Countries (for source+destination countries)
 Region
 City
 AS Number
General Storage In one embodiment, data is "packed" with a fixed "width" of bytes, so multiple sets of data can be stored in one column value with a predictable position. When dealing with variable width data, such as city names, data may be separated with a null character (0x0). For example, when data is stored as a width of 2 bytes, the numbers 1 and 2 can be stored as (shown in hexadecimal) [00 01 00 02].
Signature Indications of different signatures from different IPS engines can be stored, so we need a way to track which IPS the particular signature is referring to.

The packed data length is 8 bytes long. The first byte is the IPS. The rest is specific to each IPS.

With Snort, marked as type "1", the signature format is "snort_sig_1_2_3", where the three numbers are split up and stored as a byte, short and a byte. This adds up to 5 bytes, and the 3 remaining bytes are ignored. e.g.: snort_sig_5_6_7 will be stored as [01 05 00 06 07 00 00 00] Check Point is marked as type "2". We generate a hash from particular values of the signature and use the first 7 chars and convert them to ascii characters, e.g. cp_abc1234 becomes [02 61 62 63 31 32 33 34]

Different signatures can be packed together, e.g. using the previous two examples, [01 05 00 06 07 00 00 00 02 61 62 63 31 32 33 34]
Port Source and destination ports range from 0 to 65535, so it makes sense to use a short to store the values, e.g. port 258 would be stored as [01 02]
IPV4 Address IP addresses are stored with four 8 bit, numbers, so it makes sense to store 4 bytes of data, e.g. 1.2.3.4 would be stored as [01 02 03 04]
Country Countries are packed as 2 bytes, e.g. The countries Australia and USA would be stored as "AUUS".
Region Regions may be packed as 4 bytes, the first two bytes as the country code and the next two bytes as the localized region ID. When there isn't a possibility of using two bytes for a region, we use a number lookup instead, e.g. "NSW" is 3 bytes, so we use "02" instead. For example, NY, USA and NSW, Australia would be stored as "USNYAU02"
City City data has a variable length, since name lengths can't be predicted, and allocating a large amount of room for a fixed data width would be wasteful. Each city name may be prefixed with the country code and region code. When there is more than one value in the data, the names may be separated by a null character, e.g. Sydney, NSW, Australia and US NY New York packed together would be "AU02Sydney[NULL]USNYNew York"

AS Numbers

AS Numbers can go up to 4 bytes (RFC 4893), so we store this as 4 bytes, e.g. AS1234567890 becomes [49 96 02 D2].

Combinations

Combinations of group types are simply appended together, for example "Signature+IPV4 address+Port" for snort_sig 1_2_3, IPV4 address 192.168.0.1, and port 6667 would yield [01 01 00 02 03 CO A8 00 01 1A 0B]

Although specific exemplary data storage methodologies are described herein, it is contemplated herein that any data storage methodology may be utilized, as would be recognized by those skilled in the art, and such may still practice the exemplary embodiments described herein.

In relation to querying the groupings table to populate the user interface, we set out the following; If we want 30×1 min bins (a time range of thirty minutes) we can predict the thirty row keys. With the knowledge of the start time stamp, bin size and end time stamp, the query returns 30 row keys with the relevant timestamps.

For example, the query seeks to know who is being attacked at each minute for 30 minutes duration and show the result in the user interface 700. The following row keys would be queried:

1:1:all:1:sig_dst:snort_all:minutes:1:1249081500
1:1:all:1:sig_dst:snort_all:minutes:1:1249081560
1:1:all:1:sig_dst:snort_all:minutes:1:1249081620 . . .

Incrementing the integer timestamp by 60 each time.

Note that 1249081500 is a unix timestamp that equates to Sat Aug 1 09:05:00 2009.

That is,

1249081500=Sat Aug 1 09:05:00 2009
1249081560=Sat Aug 1 09:06:00 2009
1249081620=Sat Aug 1 09:07:00 2009

And the row keys return values like.

1→192.168.7.2
2→192.168.2.2
8→192.168.6.100, 192.168.9.2
11→192.168.1.2

Where the numbers 1, 2, 8 and 11 represent the column number and the respective IP addresses hat satisfied the criteria of the row keys.

Connections Table 402

Connections table 402 is an intermediary database to track IP connections such as TCP connections and UDP/ICMP pseudo connections.

In the connections database 402 a row key can comprise the following criteria separated by semicolons:

'user_id' as per the Bins database 400
'device_id' as per the Bins database 400
'capture_id' as per the Bins database 400
'src_addr' as per the Bins database 400
'dst_addr' as per the Bins database 400
'ts_interval' as per the Bins database 400
'ts_amount' as per the Bins database 400

The connections database 402 is populated with values and queried in a similar manner to the bins database 400.

Attacks Table 404

The attacks table 404 keeps a record of every security risk event (attack) that has been triggered by an IPS sensor.

The row key is constructed using the following information;

'user_id' as per the bins database 400
'device_id' as per the bins database 400
'capture_id' as per the bins database 400
'ts_interval' as per the bins database 400
'ts_amount' as per bins database An example row key is 1:1:1:minutes:1312653240.

The column keys are unix timestamps at a minimum width of 1 minute—a similar column structure to that of the bins database 400. However, the values stored in the database 404 represent the actual sensor event data encoded using JavaScript Object Notation (JSON) that includes a time stamp. For example, the value stored may represent one or more IPS Engines that detected the attack and an indication of the actual attack identified by each engine.

Graphs Table 408

A network graph is a data model of structured with Vertices (or Nodes) and Edges (relationships). Using a network graph the system is able to model structured and unstructured data. The network graph maintains a complete picture of all attack information for all customers.

Figure 3:
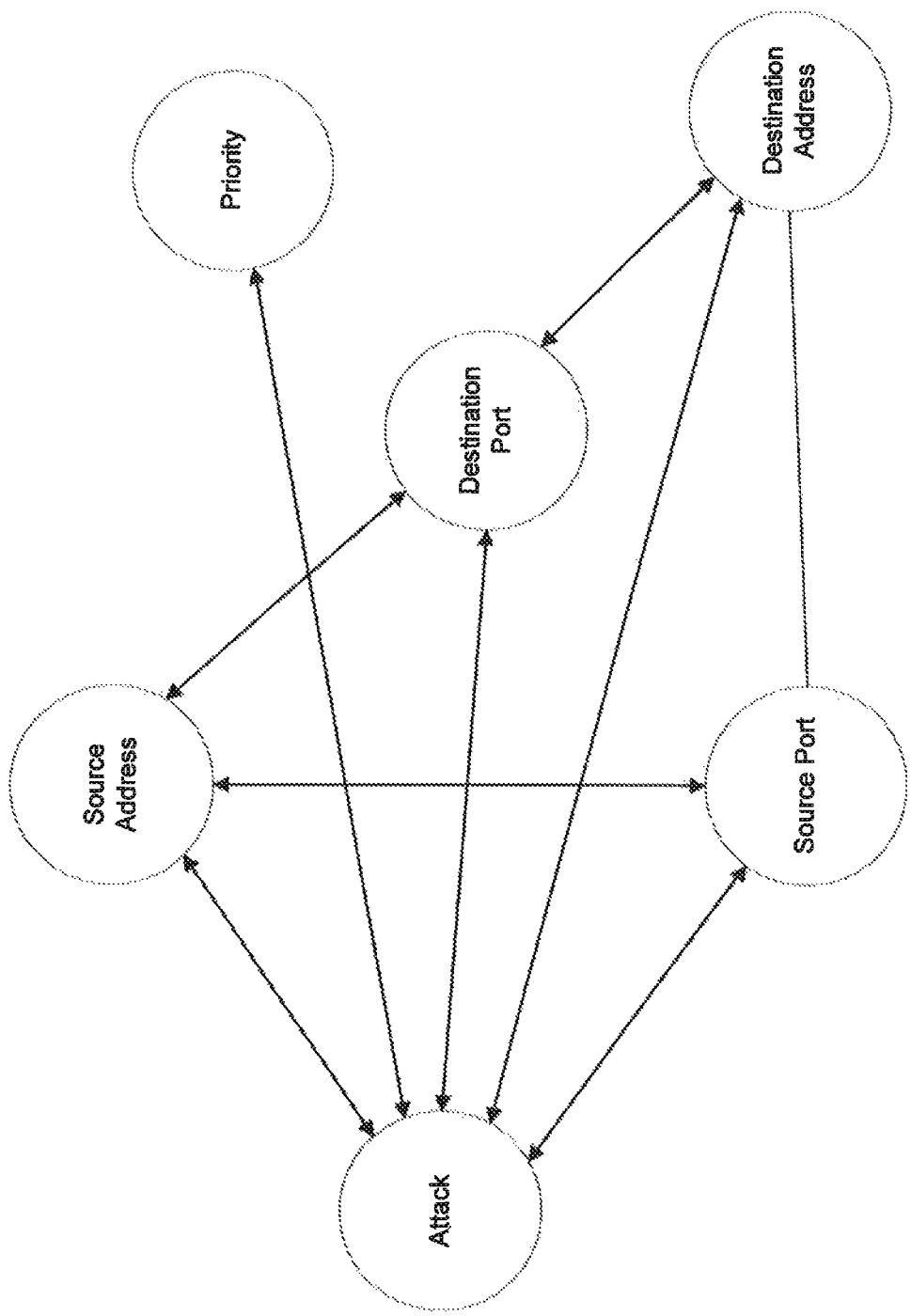
FIG. 3 schematically shows an exemplary model of the graphs database.

An example graph model is represented in FIG. 3.

Map Reduce Jobs 500-514

As can be seen from FIG. 4, and described above, the map/reduce jobs 500-514 are used to:

query the PCAPs stored on the data store 110;
insert data into one or more databases 390;
query data in one or more databases 390; or
do one or more of the above.

The map/reduce jobs 500-514 utilize a parallel processing model and in this example leverage off an open source parallel computing standard known as Hadoop.

As an example, initially a map/reduce job is run to break up the PCAPs into manageable sizes that can be processed in parallel on the Hadoop platform.

Many of the map/reduce jobs can be performed in parallel. To ensure all the data required to run a map/reduce 500 are available, the map/reduce jobs are grouped in rounds and each map reduce/job in a round is performed in parallel.

In this example, round one 520 is comprised of the following map/reduce jobs:

PCAP map/reduce Job 500 extracts data from PCAPs, such as via generating/calculating/updating sketches, and inserts into 'bins' 400 and 'connections' 402.

Snort map/reduce Job 502 extracts data from PCAPs and inserts into 'attacks' 404.

Sling map/reduce Job 504 receives data extracted from the PCAPs by sensors 750, such as the those identified as potential attacks and inserts into 'attacks' 404.

The second round 522 is comprised of the following map/reduce jobs:

Back channel map/reduce Job 506 extracts data from Connections 402 and inserts into bins 400 and groupings 402.

Attacks map/reduce job 408 extracts data from Attacks 404 and Correlations 414 and inserts into bins 400 and groupings 406 and plvdb_preprocess 410.

The third round 524 is comprised of the following map/reduce jobs:

Graph Job 510 extracts data from Attacks 404 and Correlations 414 and inserts into 'graphs' 408

PLVDB Recommend Job 512 extracts data from PLVDB Pre Process 410 and PLVDB Recommend 412 and populates Correlations 414.

The fourth round 526 is comprised of the following map/reduce job:

Focus job 514 extracts from Correlations 414 and Attacks 414 and inserts into 'bins' 400 and 'groupings' 406.

IPS Comparison and Confidence

The system re-analyzes PCAPs and/or sketches so that Intrusion Prevention Devices can inspect the traffic and produce indicators and warnings in relation to attacks.

Referring to FIG. 4, the sling map/reduce job 504 may use multiple Open Source IPS engines (e.g Snort and Suricata) and commercial IPS engines 750 (only four shown for simplicity). The system is also not limited to IPS engines. A person skilled in the art will appreciate that any device such as a sensor that performs analysis on full network captures can be used to produce indicators and warnings of security risks instead of or in addition to IPS engines 750. Further, machine learning algorithms could readily be used.

In this example, all IPS Engines 750 are independent of each other i.e. the alert of one IPS Engine 750 does not impact another IPS Engine 750. IPS Engines 750 also update their signature sets at any time. Once a signature is updated, the stored PCAPs 110 and/or sketches are re-analyzed by the relevant IPS device 750 to see if any new alerts are triggered for traffic that has previously been analyzed.

When an IPS 750 alerts, the Time, Source IP Address, Source Port, Destination IP Address, Destination Port and the exact details of the attack are stored in the Attacks database 404 by the sling map/reduce job 504. The Sling map/reduce job operates in the same way as the sling map/reduce job, however it works directly on PCAPs 110 and/or sketches to identify attacks and then make a record in the attacks table 404.

Figure 2B:
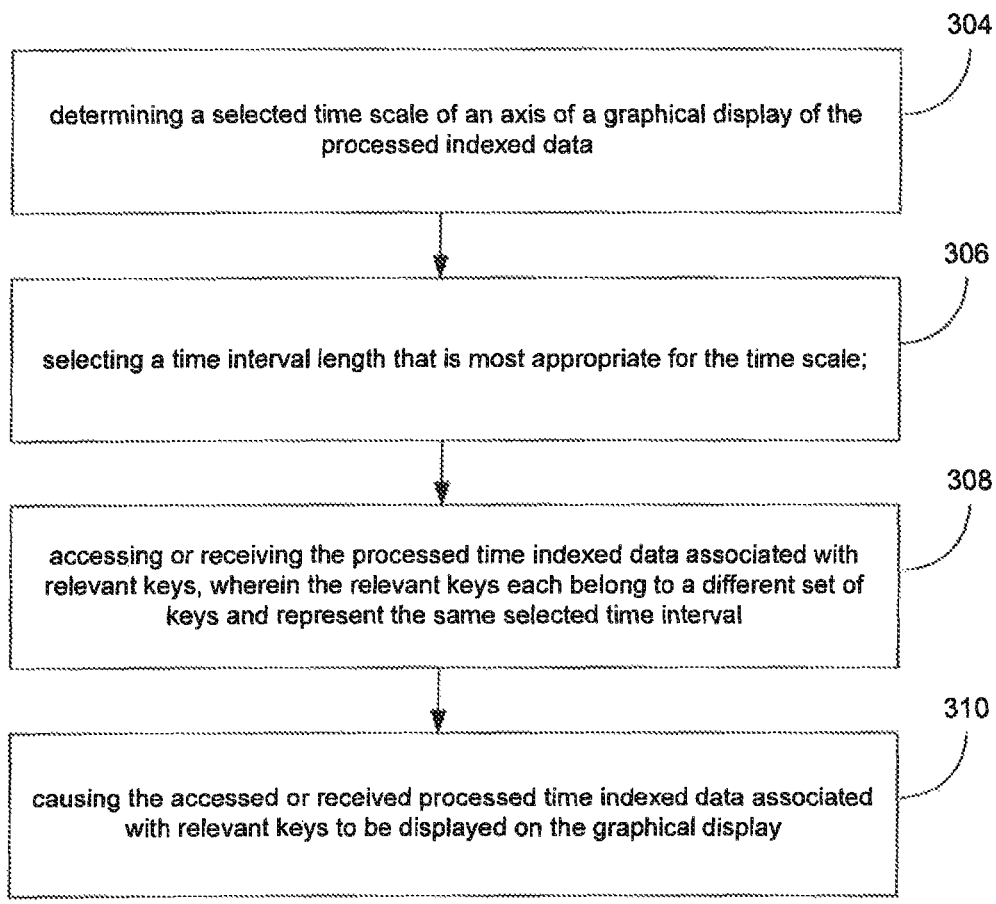
Figure 2C:
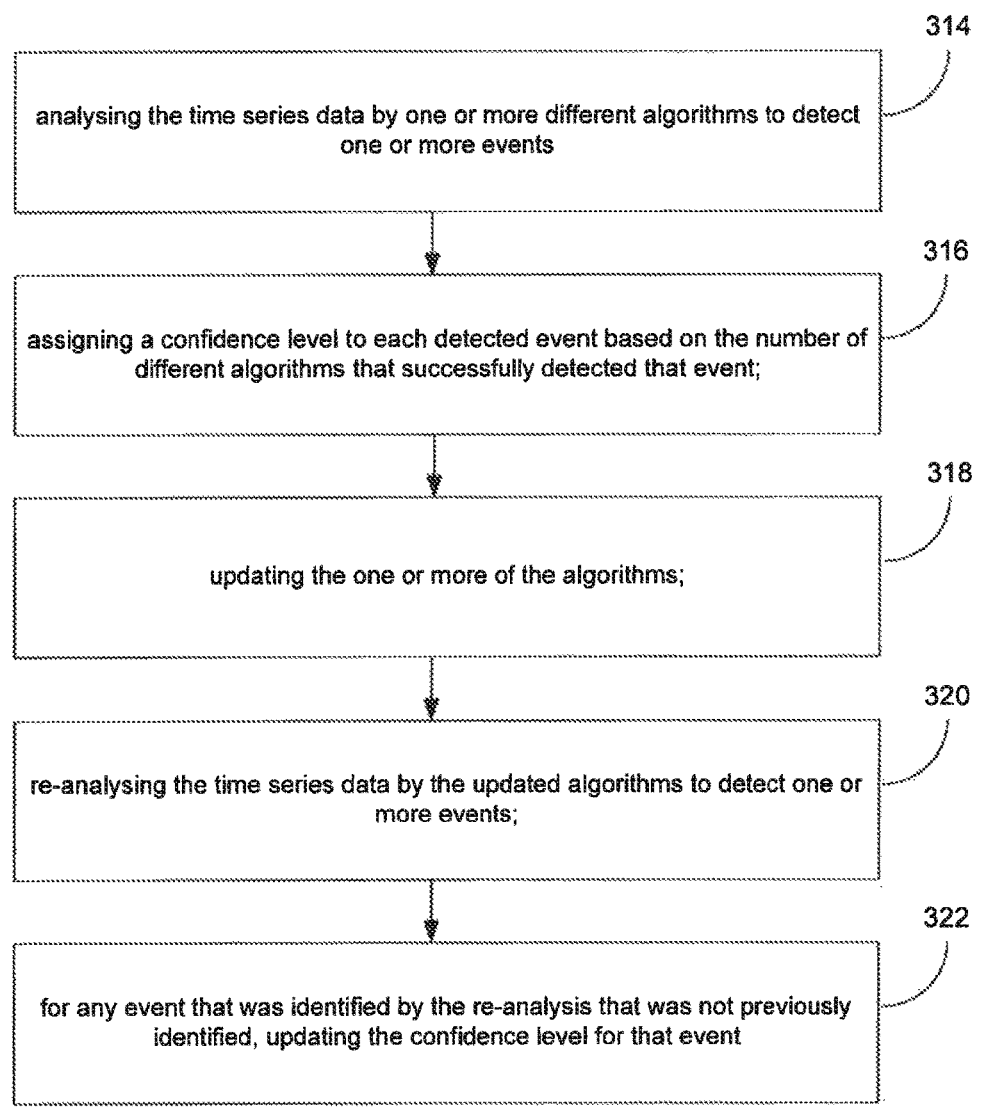

IPS Events or snort events triggered by the same conversation i.e. packets of the same source and destination information within a small time interval such as 60 seconds. A person skilled in the art will appreciate that conversations can be identified are saved to the Packetloop Vulnerability Database (PLVDB) where they can be merged into a single attack name for use within the user interface. The correlation of attack signatures informs the Focus map/reduce job 514 of a match and updates the focus level in the database 390. If the signatures are not correlated, then the confidence level is less than 1. Attack signatures can be manually or automatically tracked to determine that they trigger on the same conversations and they trigger uniformly each time the attack is found. The PLVDB shows every conversation where IPS Engines of snort map/reduce jobs triggered on the same attack type on the same conversation in the same time interval. A percentage score is linked to the correlation between conversations to determine accuracy of the correlation. For attacks based on a set of conversations with high correlation they are merged into a single attack type and the 'focus_level' is increased. Method of general operation is shown in FIG. 2(c).

Sometimes IPS Engines 750 ship with a signature or 'protection' that should detect or block a specific attack. Sometimes these signatures don't actually detect/block the attack and in some cases they may detect them sometimes but not every time. The same can be said for the accuracy of the snort map/reduce job. The system keeps a record of both types of True Negatives or False-positives. In this way information on when an IPS should trigger on a specific attack but doesn't and also how often an IPS fails to fire on an example of an attack despite firing previously.

The system presents a 'confidence level' within the user interface 700 based on the correlation percentage score to allow a user to filter out attacks based on the number of IPS Engines 750 that triggered the attack and the number of hits detected by the snort of map/reduce job. In this example the confidence is a rating between the range 1-4, but a person skilled in the art would appreciate that any scale could be applied.

When set to 1 only a single IPS engine 750 (it doesn't matter which one) of snort map/reduce job needs to register an attack for it to be shown in the user interface 700. In this example, at confidence level 4 all four IPS 750 are required to alert for it to be displayed in the Web UI 700.

The robust approach of using a number of Open Source and Commercial IPS Engines as well as customized Statistical Analysis and Machine Learning algorithms the system can get a complete picture of all Threats including:

True Positive—a legitimate attack that triggers an alert.
False Positive—an alert on network traffic that is not an attack.
False Negative—a legitimate attack where there was no alert produced.
True Negative—there is no attack and no alert is produced.

The PLVDB database will be used to track the occurrence of the first three threat conditions.

Iterate

A key problem the system solves is finding Zero Day (0 Day) attacks in past network traffic. This is accomplished by having the PCAPs and/or sketches re-analyzed by the system.

Figure 9:
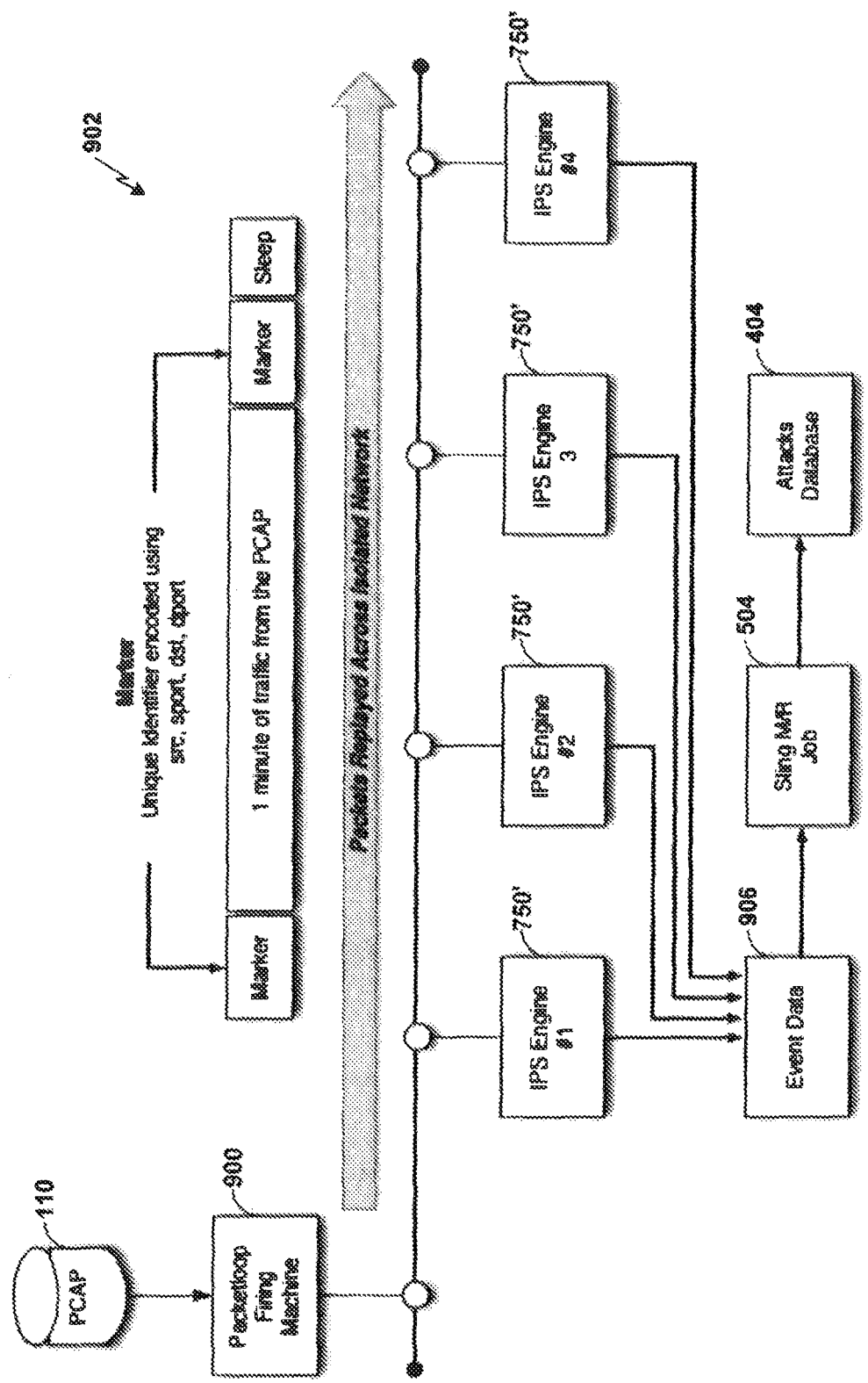
FIG. 9 is a schematic representation of a system used to identify Zero Day attacks.

An example network 902 that supports this analysis is shown in FIG. 9. The most part of this network 902 can be considered isolated from the network that supports the analysis described with reference to FIG. 4. That is, in this example the network 902 includes copies of the IPS Engines 750' as shown in FIG. 4 rather than use the same engines. This improves efficiency as the system can continue to look for Zero Day attacks in past data using the system of FIG. 9 while analyzing new PCAPs and/or sketches in the network shown in FIG. 4. The sling map/reduce job 504' may also be a copy of the sling map/reduce job 504 used in FIG. 4 or it may be the same map/reduce job. Not shown is that a snort map/reduce job 502 is also used. Unlike the sling jobs, the short job is able to analyze the native PCAPs and/or sketches and does not need to fire the PCAPs and/or sketches across the IPS Engines 450. For improved efficiency the snort and sling job are kept separate. The attacks table 404 in network 902 is the same as the attacks table in 404 which in turn provides input into the map reduce jobs of round two 522 and round three 524.

Typically the first time the PCAPs are analyzed by the network 904 none of the IPS Engines 750 alert a zero day attack because they do not have a signature for the attack.

After upgrading each IPS engine 750 with the latest signatures a replay or firing machine 900 sends the PCAPs 110 and/or sketches to be re-analyzed by the IPS Engines 750 to determine if the update signatures alert on the attack. If the snort map/reduce job is updated the snort map/reduce job can also be re-run on the PCAPs and/or sketches.

The IPS Engines 750' update their signatures at differing rates and each time an Engine 750' is updated the PCAPs 110 and/or sketches are replayed 900. The resulting alerts are compared with alerts created from the previous iteration of the analysis. When the IPS 750' finds an attack that previously was not able to be detected within the system it is referred to here as a "Looped Attack". A Looped Attack is a Zero Day attack (it was unable to be detected) that was subsequently detected through re-analyzing the past PCAPS and/or sketches by IPS Engines 750 with new attack signatures. Looped attacks often provide information of the exact method that is used to breach the network. This includes a range of information, for example, they provide information that someone used a 0 Day attack on the network 106. Generally these are reserved for targeted attacks or breaches as the 0 Day was either engineered for a specific purpose or if not engineered it was purchased for the purpose of this attack.

Further, a time range that the attack was used and the system it was used against and the source of the attack. Through enriching, location information and other information related to the incident are obtained.

Knowing the time the attack was used, the information can be filtered from that time until now to determine the conversations took place between the attacker and the victim and potentially other related systems.

As per network of FIG. 4, the IPS Engine triggers are correlated based on conversation, such as source IP address, the time, the attack used and the system that it was initiated on.

For each IPS engine 750 the system records the event data 906 created from re-analyzing the PCAPs and/or sketches. When an event is found it is processed by the Sling Map Reduce job 504 for insertion into the Attacks database 404. The sling map/reduce job 504 and attacks 404 are the same as those identified in FIG. 4. Snort and Sling map/reduce jobs operate in a similar fashion, however a main difference is the data that they operate on. Snort reads from a file and Sling reads from information that is save after PCAPs have been sent across an isolated network.

Looped attacks are also tracked. For example if all IPS Engines 750', in this example all four, do not detect an attack on their first analysis of PCAPs and/or sketches and then over time, their signatures are updated and upon detection on a subsequent analysis a Looped attack can be deduced. However this almost never happens uniformly. For example, initially all four IPS engines 750' failed to detect the attack. Then over time they are all upgraded and IPS #1 picks it up as a looped attack but IPS Engines #2-4 still do not detect the attack.

Figure 2D:
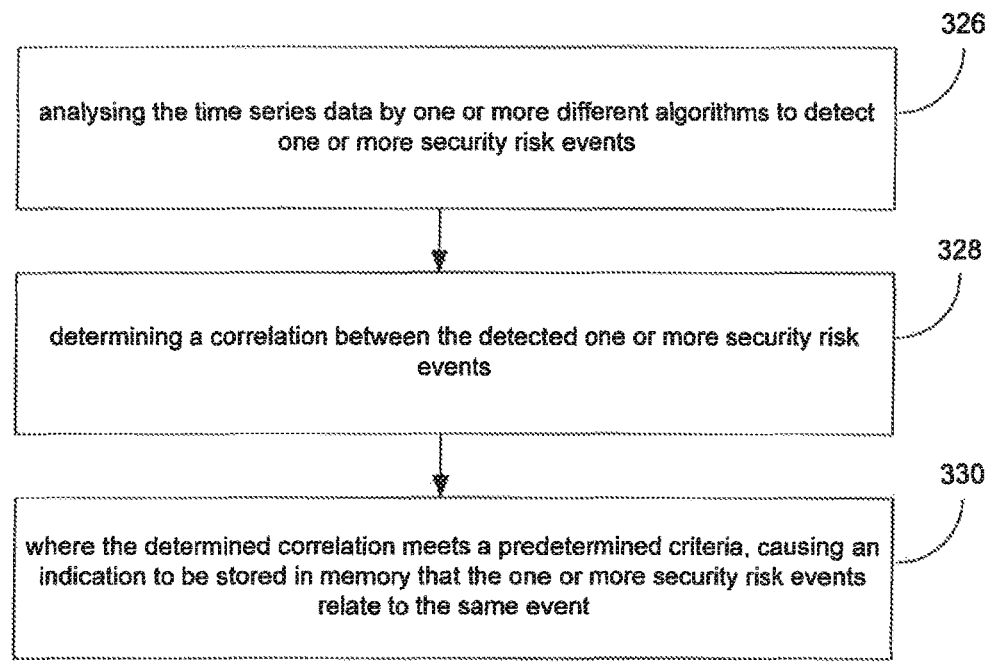
Figure 2E:
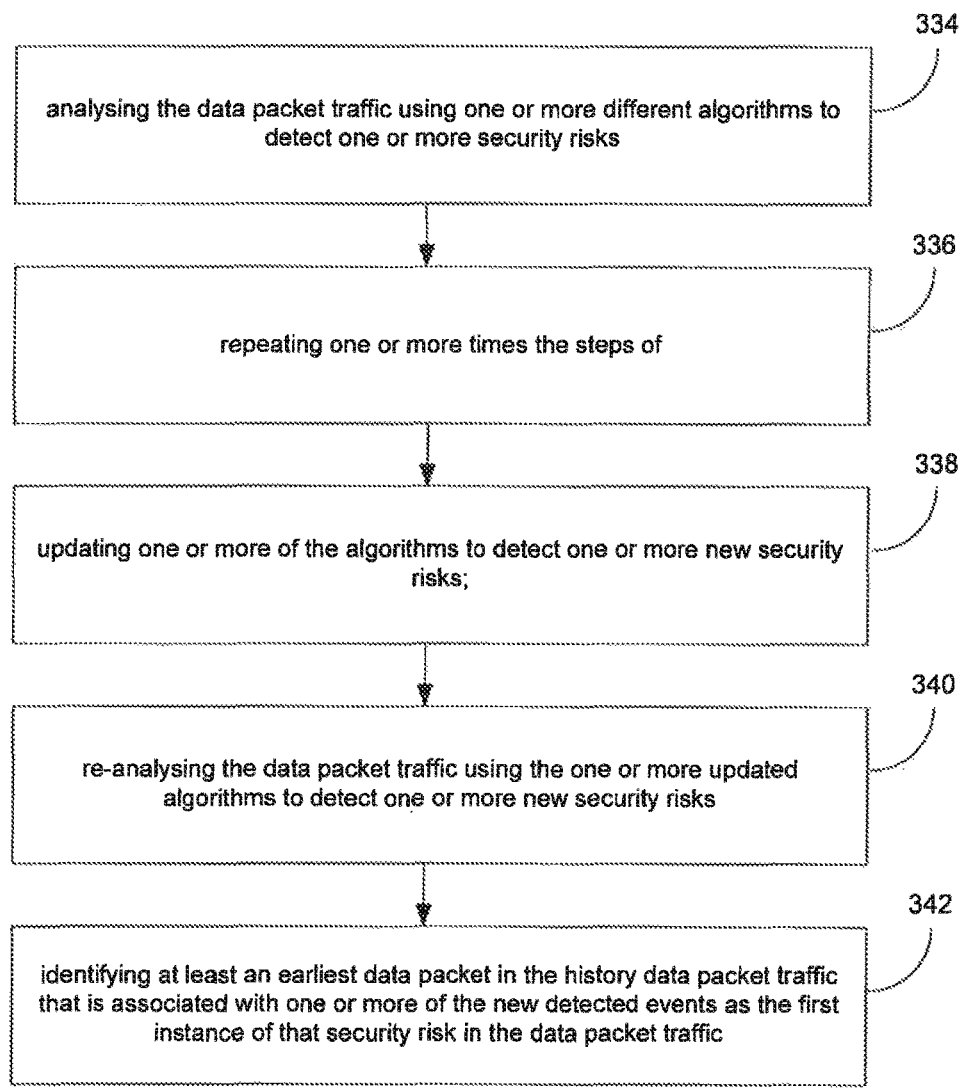

The newly detected attack is considered a looped attack because IPS Engine #1 subsequently detected it. The confidence level of this looped attack is low since the other IPS Engines did not pick it up. In this example we assign a confidence of 25% or 1 out of 4 to this looped attack. The focus map/reduce job 514 extracts attacks from the attack database 404 and also correlations from the correlations database 414 and then inserts the confidence level as appropriate in the Bins database 400 and groupings database 406. Method of general operation is shown in FIG. 2(d).

Once the other IPS Engines are upgraded and they detect the attack, the confidence level increases with each detect. In this case 50% for two IPS Engines, 75% for three IPS Engines and 100% for all four IPS Engines. The Focus job once again reads all the information out of the Attacks database 404 and Correlations database 414 and updates the Bins and Groupings tables. In this example, the existing relevant row keys are duplicated and the focus level in the duplicated row key changes. For example the value of confidence is increased by one or more. The general method of operation is shown in FIG. 2(b). A person skilled in the art will appreciate that confidence can be calculated in many ways, for example, it can be weighted according to the particular IPS Engines that have found a hit, weighted according to the type or form of the attack detected, it may not be proportional to the number of IPS Engines that identified the attack and may be based on the particular combinations of the IPS Engines that identified (or did not identify) the attack. The existing row keys are maintained for the modified focus level.

The discussion directly above discusses detecting a zero day attack using the sling map/reduce job. A person skilled in the art would appreciate that the snort map/reduce job can also be updated and re-run on the PCAPs and/or sketches to identify zero day attacks that included analysis for updating the focus level and confidence level. The sling map/reduce job may represent one or more IPS Engines (sensors).

If the PCAPs and/or sketches are processed at a time that the IPS Engines don't have a signature to identify the attack, a Vulnerability database (not shown) is used to determine whether the identified attack is a looped attack. By examining the date and time of the attack in the packet capture, industry reference for the attack (e.g. CVE ID), the disclosure date available from the Internet and the signature information from the IPS Engine can be correlated to determine if it is a looped attack. For example:

1. Whether an attack is detected by an IPS Engine with up to date signatures
2. Whether there is a signature available for the IPS Engine for this attack prior to the date/time of the attack in the capture?
3. If there wasn't a signature available then it is a looped attack. The date the IPS Engine shipped a signature to detect the attack is used as the first date that the IPS Engine would have been able to detect this looped attack.

Take the specific example of a packet capture from 1998 and the IPS Engines have the latest attack signatures. Attacks from 98 are likely to have a signature that will detect the attack as a lot of water has gone under the bridge since then.

An attack is detected with a signature from a sensor. Using the PLVDB, it can be determined when the signature was produced and available for the sensor. This determines whether this newly identified attached is a looped attack based on the release date of the signature. A comparison is made on the date of the newly identified attack against the signature release date. If the signature was released after the time, the attack in the packet captures indicates it is looped.

Using the released date of the attack signature as opposed to replaying all traffic against all signatures past and present is the more efficient approach.

The system keeps a record on which IPS Engines are the fastest at supplying signatures to find looped attacks. This information can then be used in future by the system, for example to influence the confidence level ratings.

User Interface

Data in the database 309 is presented to the user interface (UI) 700 through a standard Model, View, Controller (MVC) architecture. The View is made up of a HTML5 and Javascript web page that makes JSON calls to the Controller. The Controller queries the database 390 (the Model) and returns it to the View.

Sometimes the data is returned by the Controller without modification and sometimes the controller may be asked to do something (like produce an average, filter out particular records, or join some data). Overall the aim is to have the UI to be as responsive as possible so this means less modification requests by the controller as possible. As a result the datamodel of the database 309 is designed so as to minimize the amount of modification of the received data that has to be performed to populate the UI 700.

The system uses the bins 400, groupings 406 and graphs 408 databases to render most of the UI 700. The system works together to display time series data, counts of particular data types and the ability to dynamically filter the content shown to the user at different confidence levels.

The bins 400 and groupings 406 tables use a column oriented data model where the graphs 408 database uses a network graph to store relationship data.

The interaction of the tables will be explained for two different data sets at different resolution periods.

Figure 10:
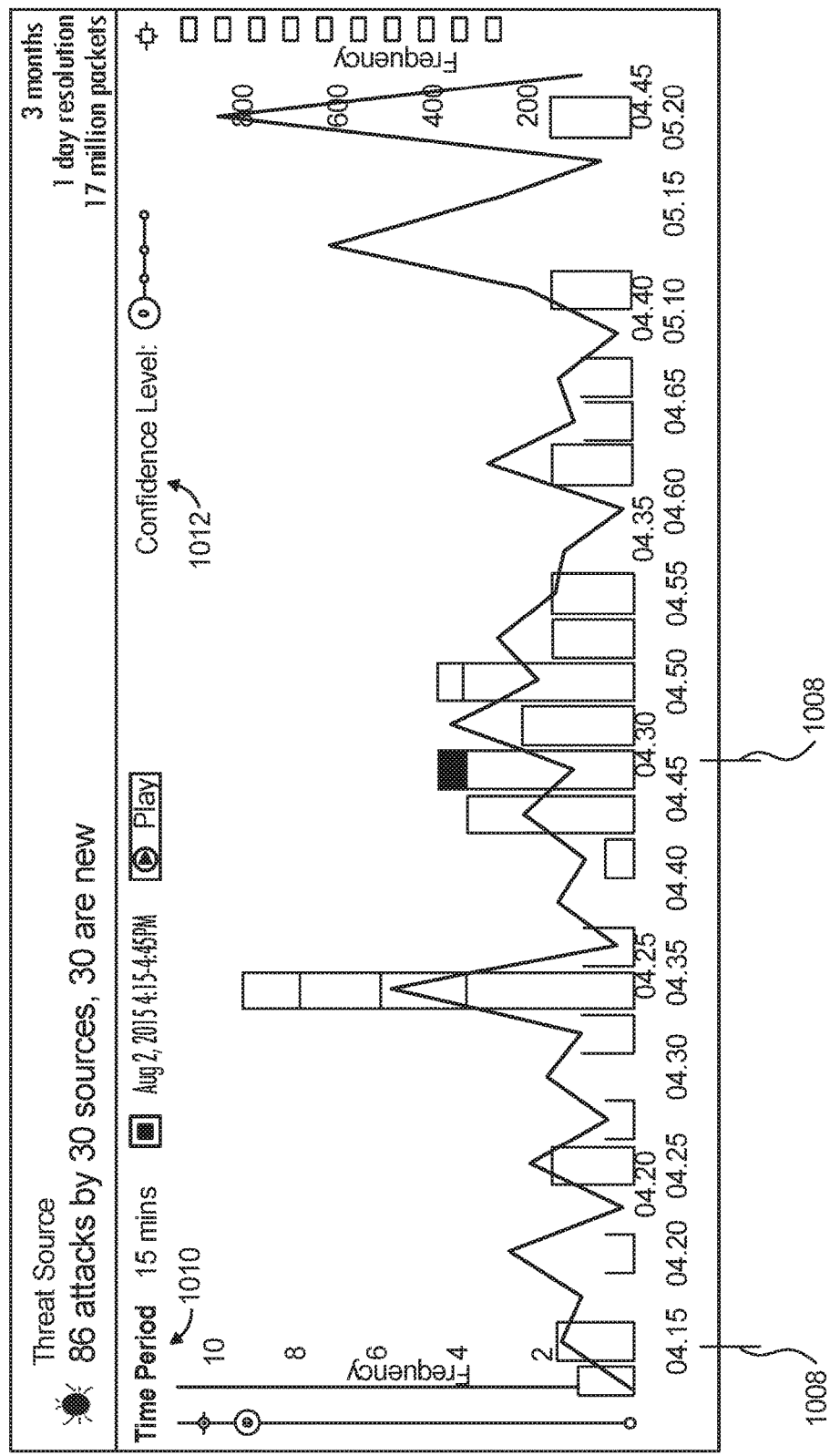
Figure 13:

The "Time Period" in the UI sets the range of time being displayed between the left and right of the main visualization. An example main visualization is shown in FIG. 10. This time period can be further refined by time slider time selection 1008.

The most appropriate time interval length is chosen for display, where the aim is to maximize the details displayed in a meaningful way, that is not too much detail that it cannot be readily understood and not too little detail that too much detailed information is lost. For example, typically a display is suited to having a time scale broken into 20 to 50 parts. For example, selecting the "Time Period" 1010 and setting it to 6 hours makes a call to the bins table for 15 minute bins, that is row keys representing a 15 minute time interval being four 15 minute bins per hour for the six hours. A time value period of 1 year would see the 1 month bins queried and a 10 year time value period has the 1 year bin queried.

The following is used to construct the query;
- Device ID, also referred to as "capture location". By including this in the query the UI 700 can display information that relates to a specific device that the PCAP was produced from.
- Capture ID. By including this in the query the UI 700 can also be filtered by one or more specific PCAP data captures.
- Data Type. This corresponds to a section of the row key e.g. "attacks_1", "attacks_2" or if querying groupings "src grouped by attacks_all" etc.
- Group By. This is only used when the groupings database is being queried
- Operand=E.g. Sum the set for updating panels.
- Limit=How many bins should be returned?
- Period Interval=Hours.
- Start time=Timestamp
- Finish time=Timestamp.
- Focus Level 1012=How many sensors need to register for data to be counted. That is the confidence level A series of requests is initiated to return data to be plotted in the main visualization leading to a series of requests being initiated to populate the data panels.

In general the bins database returns the data that is used to render the main visualization as shown in FIG. 10. Bins is also used to render data panels, such as the panel showing FIG. 11, that return the count, sum, average of time series data.

Groupings database is used to get Count of any combination of row keys. This is faster than trying to process complex combinations on the Web client. The Groupings table is used to render data panels with ranked information (e.g. the Top 10). In the example shown in FIG. 12 the Top Attacks for a specific time range is returned from the Groupings database with the count in descending order.

A user experience with the interface will now be described.

Figure 14:
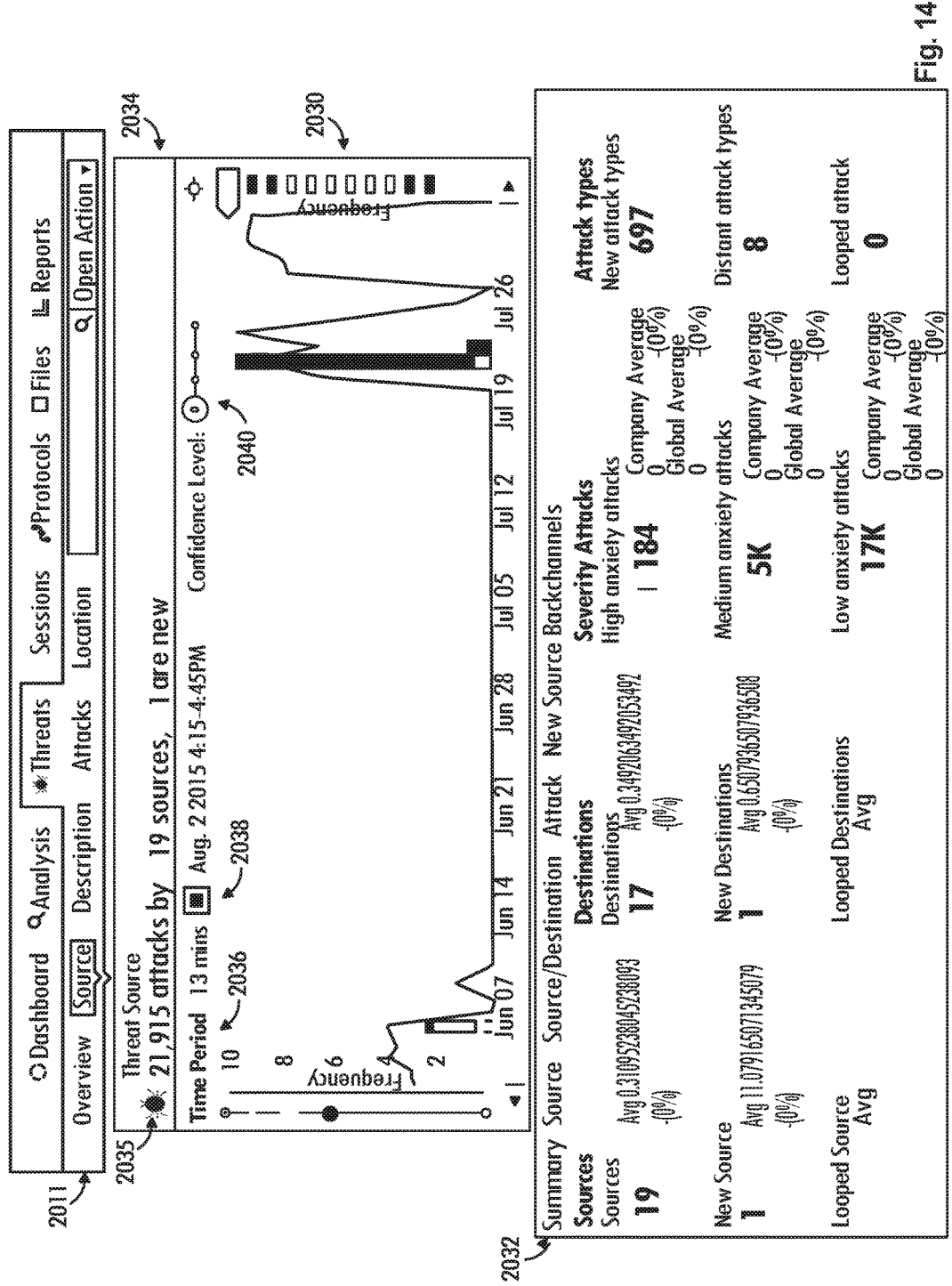

FIG. 14 shows a sample user interface. It is comprise of two main parts:
- Time series visualization 2030
- Data panel 2032

Both parts show a different way of representing the PCAPs from the network 106 from the same time period.

The time period is summarized at 2034 to describe a 3 month period and representing 17 million data packets.

Figure 15:
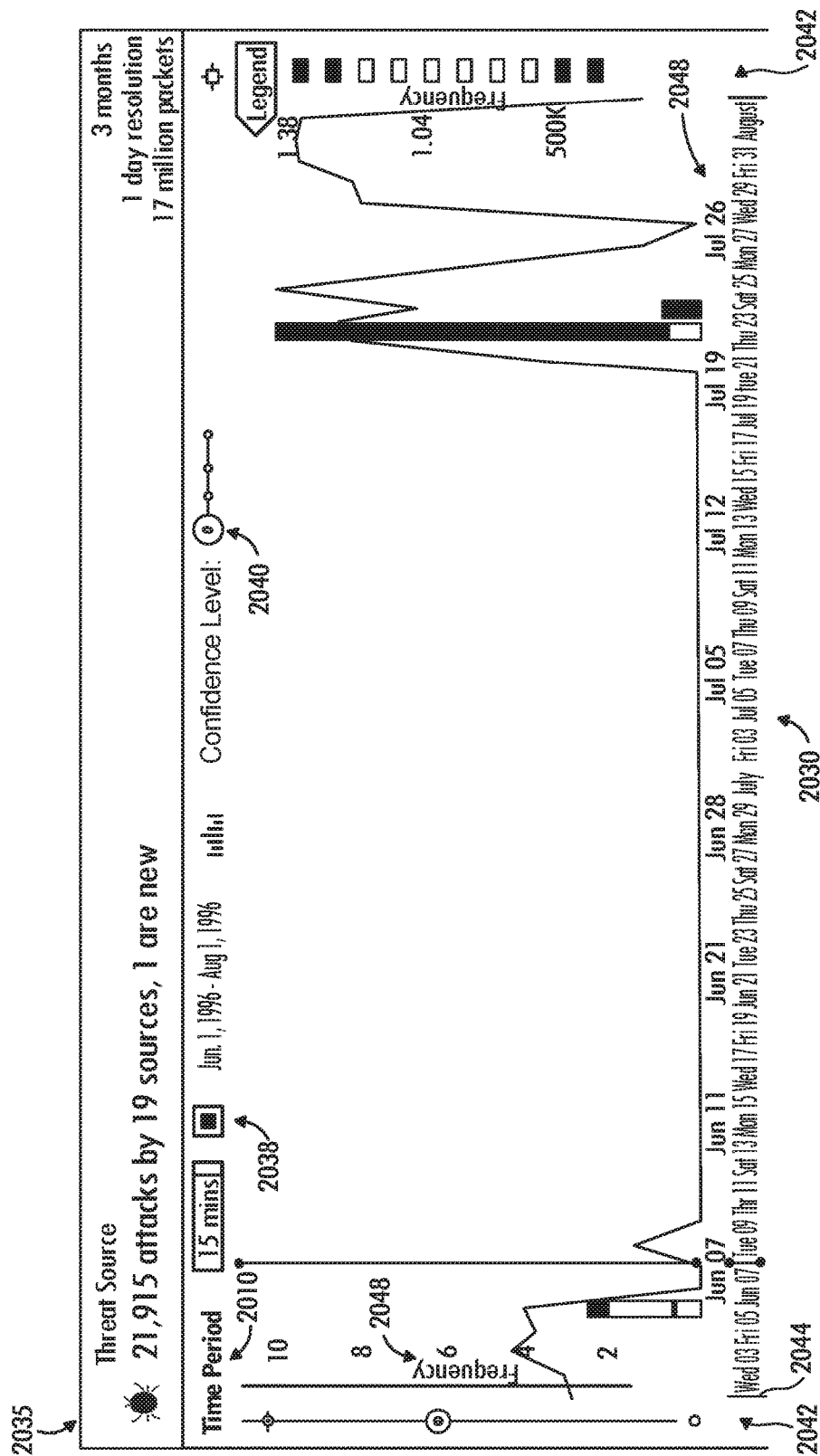

The visualization 2030 is shown slightly enlarged in FIG. 15. The user can select a time scale for the display such as by selecting a start time for the 3 month period by using the calendar function at 2038. Alternatively, the user can manipulate arrows 2042 to slide around a list of dates captured in the PCAPs. The start date is defined as the time aligned with the marker 2044.

The user can also filter the data being displayed by the confidence level as describe earlier above using the slide bar at 2040. Of course, each visualization is specific to the information being displayed.

The visualization has an x-axis 2046 that represents time and the y-axis represents 2048 that represents frequency of attacks.

To render this time series visualization of FIG. 14, the request of FIG. 19 is made to the groupings database. It defines that the datatype is source to identify all attacks. A start time stand and an end time stamp is provided, with a time range. This request returns all Source IP addresses grouped by the number of attacks made. "Attacks" in this case can be of any severity as they are grouped by "attacks_all" rather than a severity such as "attacks 1".

Four objects are returned as follows (we note that the following and further extracts are JSON with the indentation removed):

```
[
{
"time": 897004800 (Fri Jun 05 1998 10:00:00 GMT+1000 (EST)),
"value": [
["172.16.112.20", 342],
["135.13.216.191", 271],
["197.182.91.233", 206],
["135.8.60.182", 164],
["194.7.248.153", 111],
["195.73.151.50", 104],
["196.37.75.158", 103],
["195.115.218.108", 102],
["172.16.114.50", 97],
["194.27.251.21", 85]
]
},
{
"time": 897091200 (Sat Jun 06 1998 10:00:00 GMT+1000 (EST)),
"value": [
["192.168.1.1", 57],
["192.168.1.5", 57],
["199.94.100.2", 7],
["207.25.71.143", 2],
["208.221.32.46", 2],
["172.16.112.10", 1],
["136.149.142.178", 1],
["207.25.71.29", 1]
]
},
{
"time": 900979200 (Tue Jul 21 1998 10:00:00 GMT+1000 (EST)),
"value":[
["192.168.1.1", 5685]
]
},
{
"time": 901065600 (Wed Jul 22 1998 10:00:00 GMT+1000 (EST)),
"value": [
["192.168.1.1", 525],
["172.16.112.50", 2],
["192.168.1.5", 2],
["135.13.216.191", 1],
["196.37.75.158", 1]
]
}
```

Figure 16:
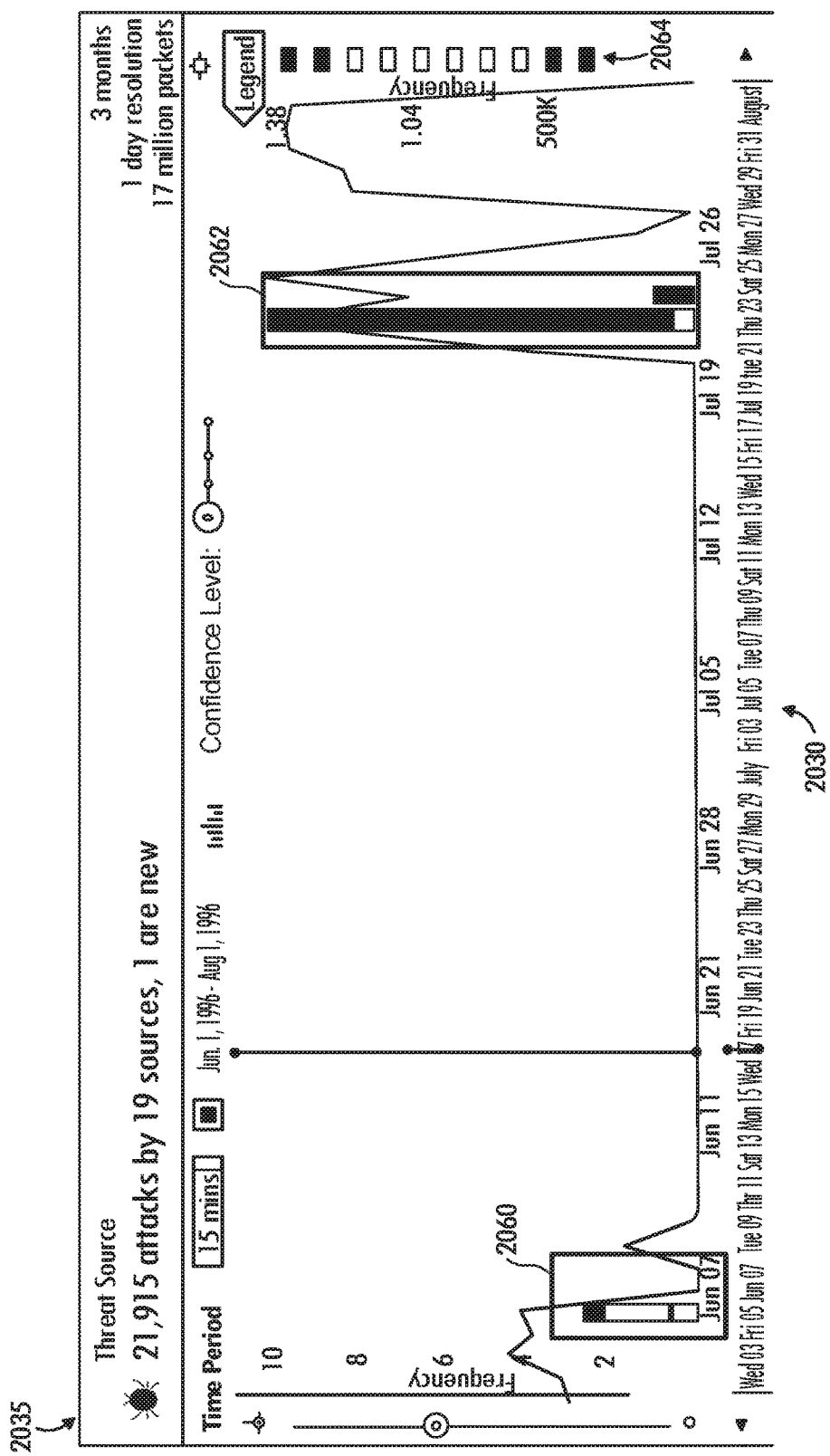

That is data of attacks identified on four different days is identified. Each source IP address identified as an attack is returned with an associated frequency count. Referring to FIG. 16, this returned data allows the main visualization 2030 to render the two columns on the left 2060 and to columns on the right 2062 hand side of the visualization based on the timestamps returned.

Each Source IP address in the graph is represented by a distinct color that is also shown in the legend 2064. The height of each bar portion is based on the frequency of the Source IP address Number of attacks. It can be seen that there were no hits between June 7 and June 20. The visualization clearly shows for example that the highest number of hits occurred on June 2, but June 5 has a greater count of source IP addresses that were the source of identified attacks. In yet another example the color could be applied to attack types or sensor that detected the attacks rather than source IP address.

This is summarized at 2035 that states that the system identified in these 17 million packets 21,925 attacks from 19 sources, and 1 of these are new.

As can be seen from the request shown in FIG. 19, the information presented is specifically related to the source. By selecting one of the tabs at 2011 being Destination, Attacks and Locations the same 17 million packets will be summarized in the interface but specific to the selected tab. So the first box in the query of FIG. 19 would include as the data type the tab selected at 2011.

A number of pre-set time value ranges are provided to the user via the "Time Period" select box 2036, 1010. This sets the time range that will be viewed and in turn the appropriate bin resolution that will be queried from the bins and groupings databases. In this example, a selection of 15 minutes from the "time period" selector 2036 means that 1 hour and 1 minute time bins are used. In comparison, a selection of 6 hours means that time bins of 15 minutes are used.

For example, initially, the visualization of FIG. 15 displays the most recent data. Then the user can use the time period. Then you could use the time period drop down 2036 to compare time periods, such as comparing today to yesterday by selecting '1 Day'. For time scales longer than this you can either use the 7 Days, 1 month or 1 year or start to use the calendar.

The number of bins and their widths is a decision made by the system based on performance and the number of bins that look good and are informative in the visualization. So for example when 1 year or 3 years is viewed you might get 12 or 36 one-month bins.

Figure 17:
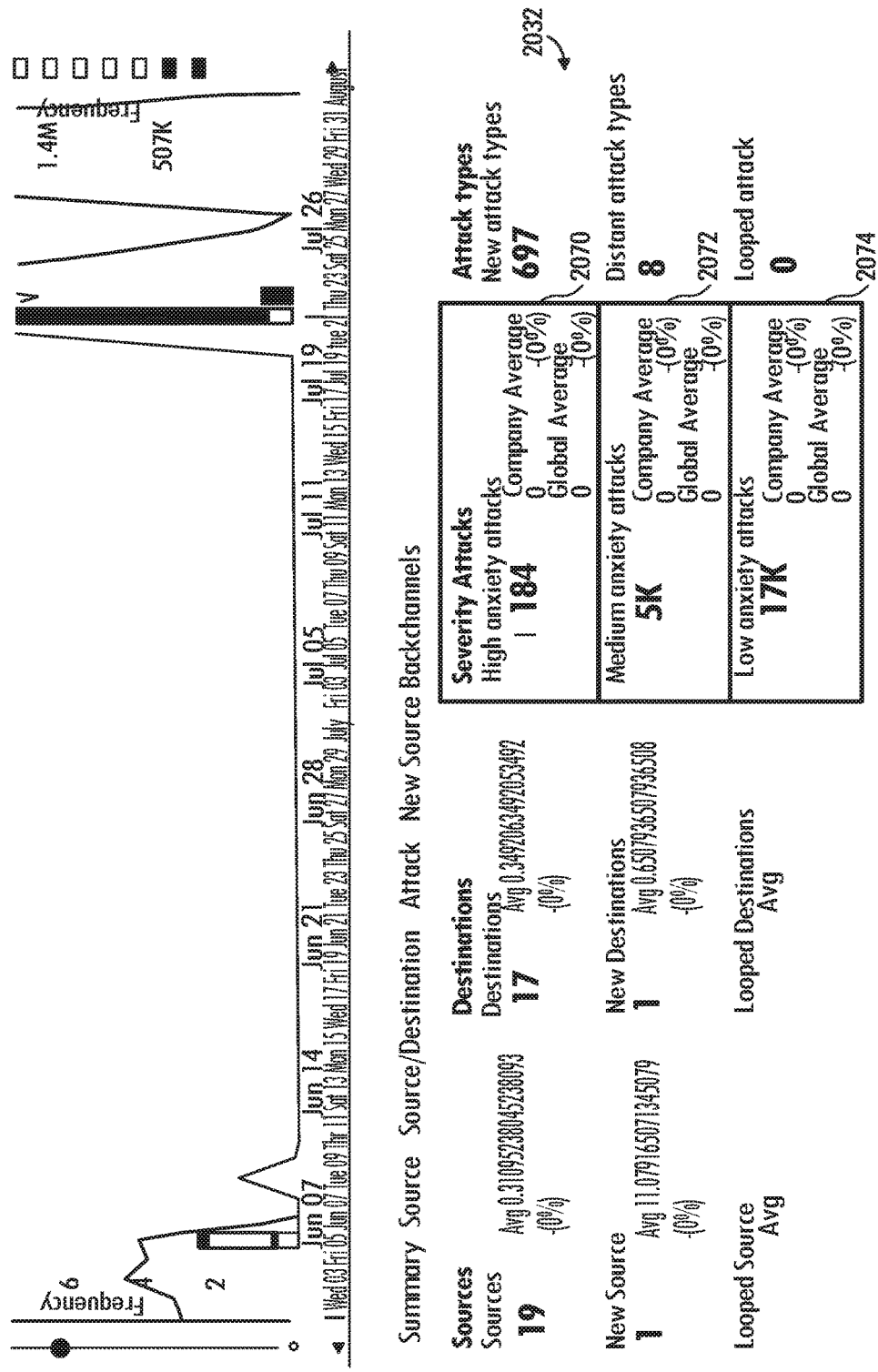

A slightly enlarged data panel 2032 is shown in FIG. 17. By way of example of querying the Bins database, the data summarized at 2070, 2072 and 2074 will now be described. 2070 indicates the number of attacks stored in the bins database for the row keys having criteria "type" as high attacks (attacks_1) 2072 indicates the number of attacks stored in the bins database for the row keys having criteria "type" as medium attacks (attacks_2). Finally, 2074 indicates the number of attacks stored in the bins database for the row keys having criteria "type" as low attacks (attacks_3).

The total for box 2070 is populated based on the query values shown in FIG. 20. That is the data type is attacks_1 and there is no grouping as the query is to the bins database and not the groupings database. The same values for interval start and end time stamp, and range are given as the query of FIG. 19. In this case three objects are returned as follows:

```
[
{
"time": 897004800 (Fri Jun 05 1998 10:00:00 GMT+1000 (EST)),
"value": 18,
"y0": 0,
"y": 18
},
{
"time": 897091200 (Sat Jun 06 1998 10:00:00 GMT+1000 (EST)),
"value": 1,
"y0": 0,
"y": 1
},
{
"time": 900979200 (Tue Jul 21 1998 10:00:00 GMT+1000 (EST)),
"value": 165,
"y0": 0,
"y": 165
}
]
```

It is noted that Y0 above is generated by the javascript as a way of storing values to be rendered in the time series. The values we are returning from the database via the controller. Is 'time' and 'value'. The y and y0 are produced by a Javascript framework used for graphics and visualization.

The data includes three time stamps for each bin where there has been a high attack. Within each bin there is a value and/or sketch. The total of 184 as displayed at 2070 is determined by adding 18+1+165.

The total for Medium attacks is produced by a query to the Bins database as shown in FIG. 21. It can be seen that it only differs from the query in FIG. 20 in that the datatype is for "attacks_2" and returns three objects as follows:

Which returns the following data;

```
[
{
"time": 897004800 (Fri Jun 05 1998 10:00:00 GMT+1000 (EST)),
"value": 1780,
"y0": 0,
"y": 1780
},
{
"time": 900979200 (Tue Jul 21 1998 10:00:00 GMT+1000 (EST)),
"value": 3205,
"y0": 0,
"y": 3205
},
{
"time": 901065600 (Wed Jul 22 1998 10:00:00GMT+1000 (EST)),
"value": 4,
"y0": 0,
"y": 4
}
]
```

Again, the data includes three time stamps for each bin where there has been a medium attack. Within each bin there is a value. The total 5K is a rounded version of 1780+3205+4=4989.

The total for low attacks is produced by a query to the Bins database as shown in FIG. 22. It can be seen that it only differs from the query in FIG. 20 in that the datatype is for "attacks_3" and returns four objects as follows:

```
[
{
"time": 897004800 (Fri Jun 05 1998 10:00:00 GMT+1000 (EST)),
"value": 1959
},
```

-continued

```
{
"time": 897091200 (Sat Jun 06 1998 10:00:00 GMT+1000 (EST)),
"value": 127
},
{
"time": 900979200 (Tue Jul 21 1998 10:00:00 GMT+1000 (EST)),
"value": 14135
},
{
"time": 901065600 (Wed Jul 22 1998 10:00:00 GMT+1000 (EST)),
"value": 527
}
]
```

In the data returned we have the time stamp for each bin where there has been a low attack. Within each bin there is a value. The total of 17K is a rounded version of 1959+127+14135+527=16748.

A further example shows the use of time bins to efficiently populate the user interface 700. In FIG. 14 the x-axis represents the time scale in the interval of days. In order to keep the visualization as informative as possible, the bins that are queried stems from the groupings table on the time scale of the x-axis 2046 that in turn impacts the resolution of the visualization display 2030.

Initially the scale selected by the user for display is determined by the system. The user can amend the time scale of the x-axis 2046 simply by scrolling over the visualization display 2030. A person skilled in the art will appreciate that many different functionalities can be incorporated into the user interface to allow for this 'zooming' functionality.

In one example, once the x-axis has been adjusted the start and end times of the x-axis are analyzed by the system to determine if the resolution of the display is appropriate for sufficient information display. The system implements this by determining the time interval for the x-axis suitable for the level of zoom selected.

The system subsequently accesses processed information from the databases 390 and from the groupings table associated with the relevant keys. That is for the set of criteria queried each belonging to a different set of keys and represent the same selected time interval.

For example, if the length of the x-axis represented 1 hour, it may be determined that the appropriate bin internal is 1 minute. Accordingly, the query of FIG. 19 would be sent the groupings table at the time interval (bin) in the query of 1 minute instead of 1 day.

Alternatively, if the length of the x-axis represented 1 day, it may be determined that the appropriate bin internal is 1 hour. Accordingly, the query of FIG. 19 would be sent to the groupings table at 1 hour rather than 1 day.

A number of Map/reduce jobs process packet captures based on specific logic that is used in the user interface. These relate to;
  Backchannels
  New
  Distinct
  Looped The Backchannels map/reduce job looks at every attack (between a Source and a Destination) and then determines whether the Destination of the attack ever connects back to the Source. This backchannel job still uncovers attacks and covert communication that need to be further analyzed.

The new map/reduce job compares every bin at every bin width and compares it to all bins before it to see what objects are 'new' or have never been seen in the current bin. For example this enables displaying in the user interface not all the data but only the data that is new within the current time range. This allows the identification of outliers and abnormalities more readily. The new map/reduce job works on all objects within the data model—IP, Country, City, ISP, Attacks, Protocols etc. Based on these new counts averages of new occurrences can be calculated.

The distinct map/reduce job allows the system to quickly report on what is distinct per bin in relation to any data object in the system. Distinct Sources or Destination and distinct attacks are good examples. Instead of having to request the data and then determine what is distinct on the client side this is pre-processed using this distinct map/reduce job and the distinct figures inserted into the data model. This also allows us to determine the average of distinct.

A number of Map/reduce jobs process packet captures based on specific logic that is used in the user interface. These relate to;
  Backchannels
  New
  Distinct
  Looped The Backchannels map/reduce job inspects every attack (between a Source and a Destination) and determines whether the Destination of the attack ever connects back to the Source. This backchannel job still uncovers attacks and covert communication that need to be further analysed.

The 'new' map/reduce job compares every bin at every bin width and compares it to all bins before it to determine the 'new' or have never been seen objects in the current bin. For example this enables displaying in the user interface not all the data but only the data that is new within the current time range. This allows the identification of outliers and abnormalities more readily. The new map/reduce job works on all objects within the data model—IP, Country, City, ISP, Attacks, Protocols etc. Based on these new counts averages of new occurrences can be calculated.

The distinct map/reduce job allows the system to quickly report on the distinctions per bin in relation to any data object in the system. Distinct Sources or Destination and distinct attacks are good examples. Instead of having to request the data and then determine the distinctions on the client side, this is pre-processed using this distinct map/reduce job and the distinct figures inserted into the data model. This also allows for the determination the average of distinct.

The difference between Bins and Groupings databases will now be described in more detail.

For any set of row keys and a time slice the Bins database returns the key, column key (timestamp) and a value.

Recall that row keys of the bin database may be constructed using the following schema, where each component is separated by semicolums:

```
User_id
Device_id
Capture_id
focus_level
src_addr
src_port
dst_addr
dst_port
type
ts_interval
ts_amount
```

For example the row key of the bins database reads as follows:
(a) 1:1:57:1:any:60011:any:any:snort_sig_1_1394_12: minutes:1 in the column having a time stamp of 1249081920 there is stored an integer value such as 1. Meaning that in the one minute defined by the row key and column there was one instance that satisfied this row key.

Another row key of the same set in the Bin database may be:
(b) 1:1:57:1:any:60011:any any:snort sig_1_1394_12: minutes:5
(c) 1:1:57:1:any:60011:any:any:snort_sig_1_1394_12: hours:1

That is the criteria 1:1:57:1:any:60011:any:any: snort_sig_1_1394_12 of each row key (a), (b), and (c) stay the same but the only the time interval represented by the combination of 'ts_interval' and 'ts_amount' are different. (a) represents a time interval of 1 minute, (b) represents 5 minutes and (c) represents 1 hour.

In other examples, a row key need not have the field 'ts_amount', only 'ts_interval'. In which case, in a set of row keys the 'ts_amount' for each would be different. Practically, this alternative would require more 'ts_amount' alternatives in the set of row keys to provide the same display efficiency.

When querying the groupings database the timestamp is specific as part of the query (ts_value). Recall that row keys of the groupings database is constructed using the following schema, where each component is separated by semicolums:

User_id
device_id
capture_id
focus_level
type
ts_interval
ts_amount
ts_value

For example the row key of the groupings database may read as follows:
(d) 1:1:all:1:sig_dportattacks_all:minutes:1:1249083960 in the column representing the count 1 the following may be stored
36965 47618 41421 34001 51577 49165 49523 50259
in the column representing the count 10 the following may be stored
6977
in the column representing the count 14 the following may be stored
2337

Another row key of the same set in the Bin database may be:
(e) 1:1:all:1:sig_dport:attacks_all:minutes:5:1249083960
(f) 1:1:all:1:sig_dport:attacks_all:month:6:1249083960

That is the criteria 1:1:all:1:sig_dportattacks_all and 1249083960 of each row key (d), (e), and (f) stay the same but the only the time interval represented by the combination of 'ts_interval' and 'ts_amount' are different.
(a) represents a time interval of 1 minute, (b) represents 5 minutes and (c) represents 6 months.

To compare the bins and groupings database directly, take an example of a groupings table row key having criteria to store values destination port (sig_dport) for an attack of any severity (attacks_all) within a 1 minute period of the timestamp 1249083960. The groupings database may not return a timestamp and value/sketch like the bins table, but rather an integer value for the column and the value/sketch that has been requested. In this case it is a separated list of destination ports. The data returned states that destination ports 36965, 47618, 41421, 34001, 51577, 49165, 49523, 50259 were seen in one attack during the minute starting with the timestamp and so on.

The graphs database uses a network graph to build a node and relationship graph.

The network graph is traversed so that any object that is selected shows only the relationships related to that object.

Figure 18:
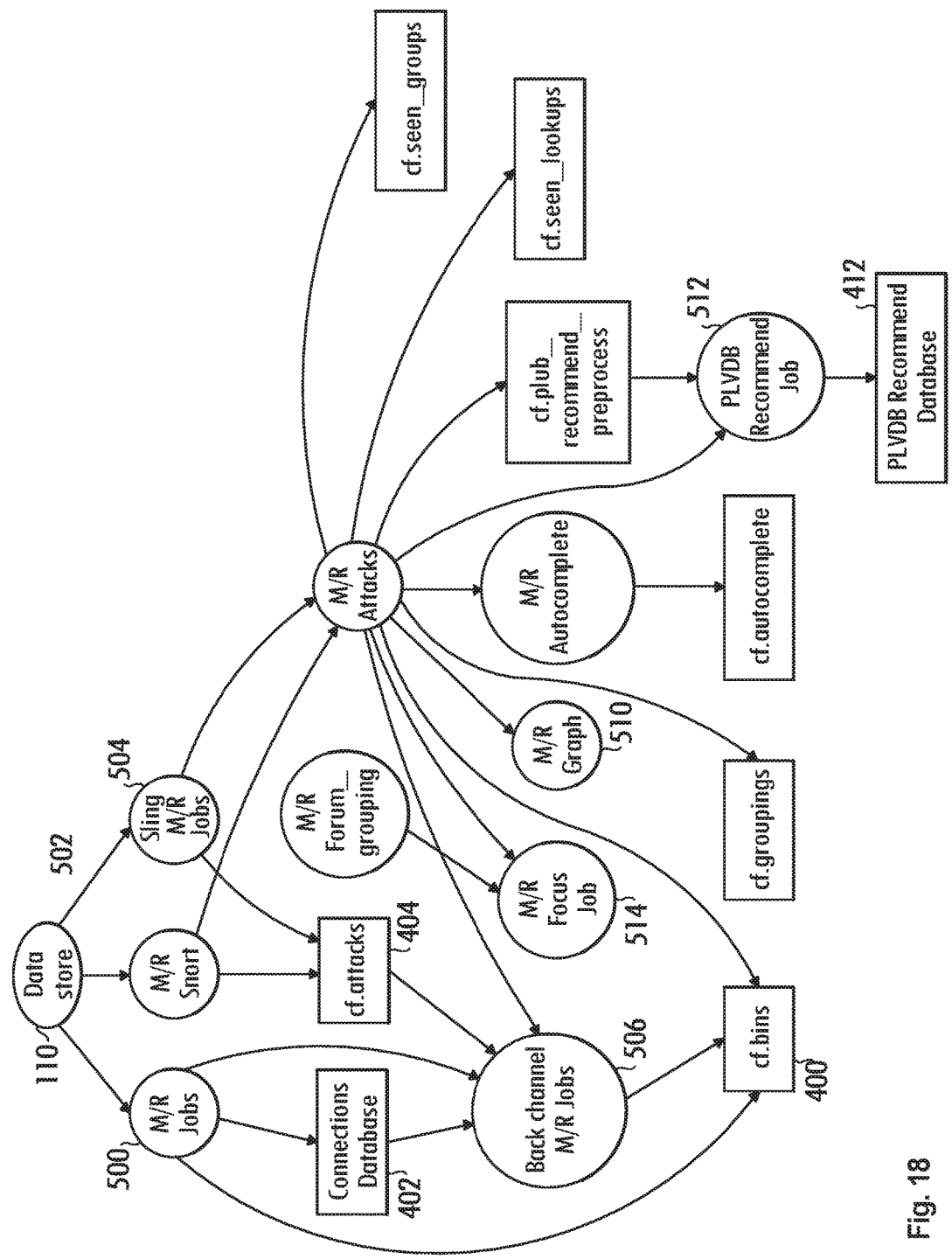
FIG. 18 shows how exemplary map/reduce jobs link to a data model.

FIG. 18 shows the link between all jobs and the data model.

It will be appreciated by persons skilled in the art that numerous variations and/or modifications may be made to the above-described embodiments, without departing from the broad general scope of the present disclosure.

The system can be provided as an on-premise version on the network 106. That is the system is delivered as a turnkey solution for the capture, processing and analysis. The alternative is an onsite hardware appliance such as a sensor are placed on the network 106 to capture traffic with very low latency and a server, such as a virtual server, that stores the PCAPs, processes them (e.g., by calculating one or more sketches) and makes the analysis available by a similar but local hosted user interface. Typically this onsite solution operates in real-time mode rather than through batch processing that is typically performed with the service in the cloud model.

A person skilled in the art would understand that the implementation of the solution can be performed in real-time, including the distributed cloud model discussed in detail further above or the onsite implementation. In this case the data traffic is analysed using Stream processing as opposed to Map/Reduce. In this case a software service Storm Processor may be used in lieu of Hadoop. As a result Map/Reduce jobs are distributed processing units that act on data as it passes through the topology of the real-time implementation. The data is inserted into the tables at the end of the Stream process rather than the Map/Reduce process.

Implementations may also include a combination of processing network data packets in real-time and batch processing. Advantage of such an implementation that includes real-time processing is the reduction in latency.

It should be appreciated that the datastore 110 may be disk or memory. The term memory here is also used to refer to disk.

Figure 6:
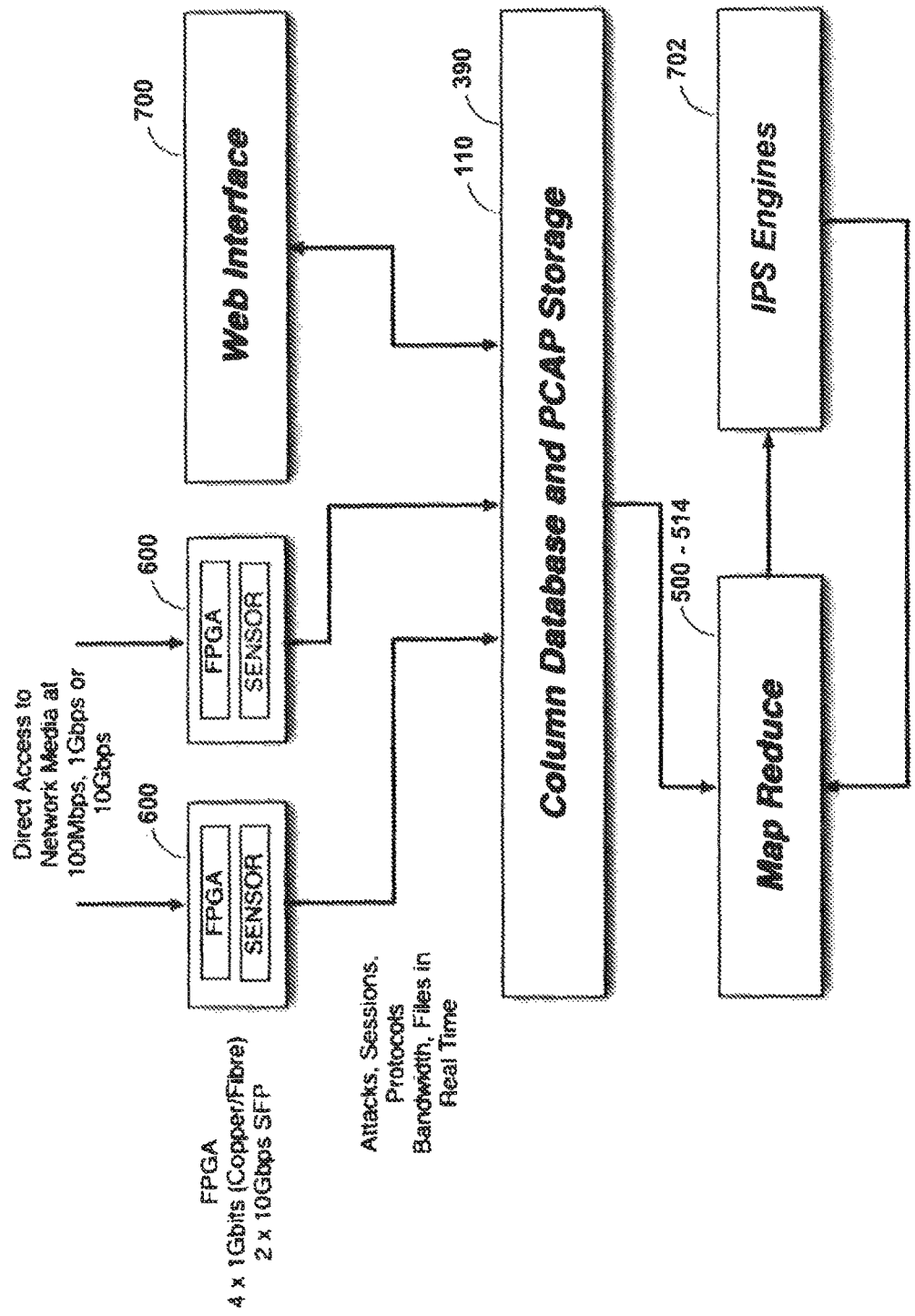
FIG. 6 is a schematic representation of components of an on-site version of the system.

This alternative implementation is shown in FIG. 6, where hardware sensors 600 are installed in the network 106 and given direct access to the network segments that are required to be monitored. All traffic (can be at different speeds) is passed through the Field Programmable Gate Array (FPGA) 600 that operates software. The raw packet capture information is then passed to the Sensor software that extracts important features from the data in real-time.

The sensor software then inserts the row keys and values into the distributed database 390. Because the FPGA operates at very low latency, getting data from the network and into the database 390 happens very quickly (less than 1 second) and provides the User Interface 700 with a smooth real-time capability. Note that unlike the software as a service solution described earlier, the PCAPs and/or sketches and Snort map/reduce job would insert directly into the column oriented databases. Then map/reduce jobs that extract data and perform Sling, Focus etc would then be run to back fill the information needed. The main difference is that the aim of this solution is to have the sensors 600 enter as much information into the databases as possible. In turn, this reduces the number of map/reduce jobs needed. However, Map/reduce jobs 500-514 still perform calculations that require the entire dataset (e.g. determining what data has never been seen before).

All traffic from the sensors may be still stored 110 in PCAP format and/or sketch format for Map/reduce jobs to operate on. In addition, these PCAPs and/or sketches may be used to iterate the IPS Engines 702 that cannot be installed on the sensor 600 itself and for period replay of all capture data. That is, the sensor 600 would process data real-time straight from the network and insert keys into the databases. It may also store the data in PCAP format for the later map/reduce jobs to process and act on.

Figure 8:
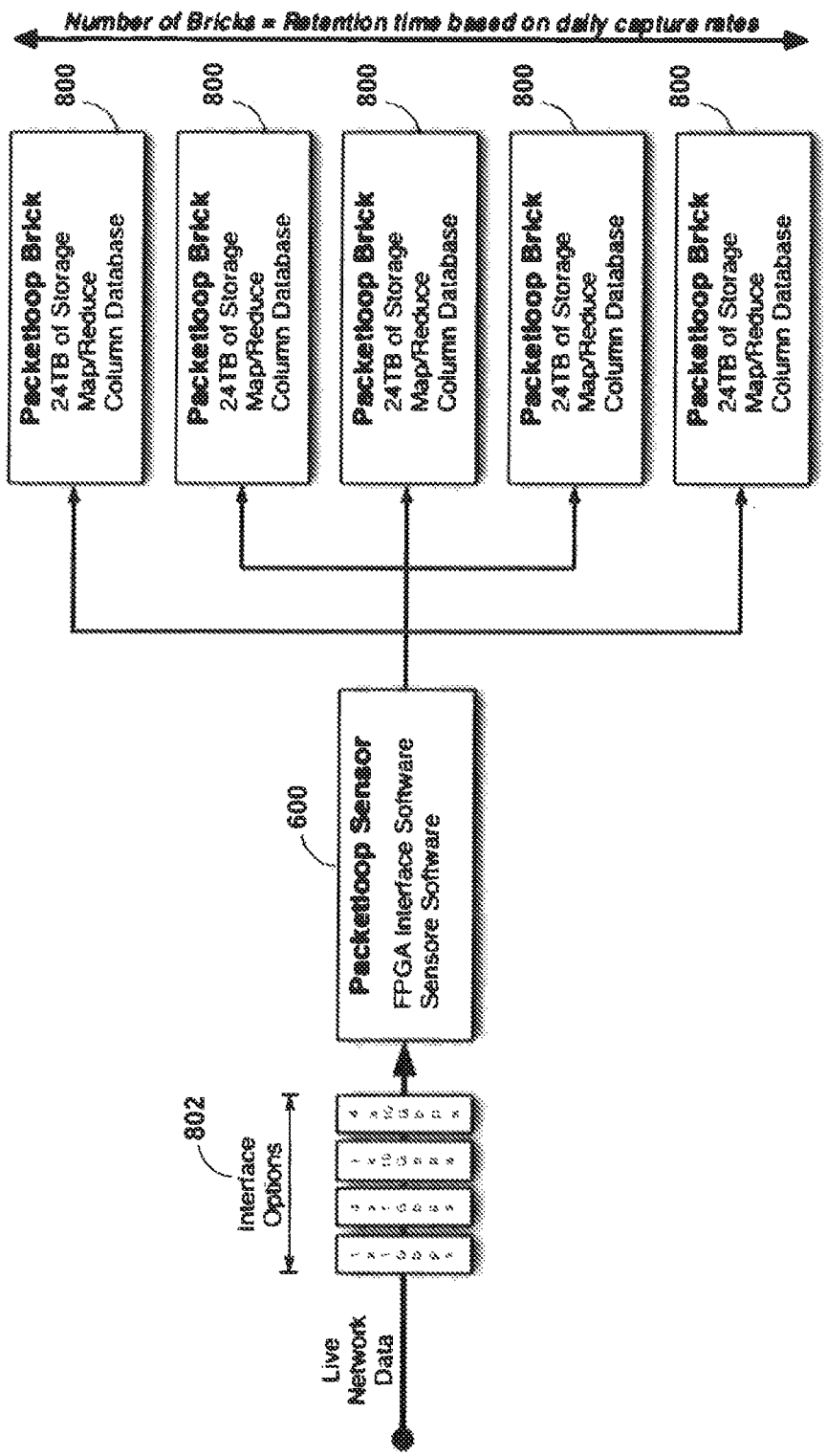
FIG. 8 is a further schematic representation of components of an on-site version of the system.

Another main difference between the system operating in the Cloud as a Software as a Service compared to the premises of the network 106 is that the on premise solution deploys hardware sensors 600 that access the network traffic and forward to Bricks 800 as shown in FIG. 8. The Bricks 800 are comprised direct attached disk, map/reduce software, column oriented database and source code, map reduce jobs and isolated networks iterating PCAPs through the system.

Bricks 800 increment based on the amount of retention the required and the daily rate of PCAPs. The faster the network 106 speed, the more network segments they need to capture and the length of time retained determines the number of bricks 800 that are deployed.

The Sensor 600 has a number of interface options 802 that can be selected depending on the speed and number of the network segments that need to be monitored. The FPGA software extracts the TCP/IP packet information from the physical interface and passes this to the sensor software. The features extracted are then inserted into the database 110 redundantly spread across all Bricks 800.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprise", "include", and conjugations thereof are to be interpreted as specifying the presence of the stated features, integers, steps or components, but not precluding the presence of one or more other features, integers, steps or components or groups thereof.

Although various systems and methods of the subject invention have been described with respect to the embodiments disclosed above, those skilled in the art will readily appreciate that changes and modifications may be made thereto without departing from the spirit and scope of the subject invention as defined by the appended claims.

The present embodiments are, therefore, to be considered in all respects as illustrative and not restrictive.

The invention claimed is:

1. A computer-implemented method comprising:
   generating a model related to network traffic, wherein the model comprises values and is indexed by a plurality of sets of keys and a plurality of time ranges, and each value comprises a sketch that approximates network traffic that is consistent with a key of the plurality of sets of keys and a time range of the plurality of time ranges, wherein each key within the sets of keys defines different criteria of multiple criteria to be compared to the network traffic; and wherein each set of keys define criteria that include a time interval and a time amount, the time amount representing a multiple of the time interval, each multiple defining a different resolution of a time scale used by that set of keys;
   displaying the model;
   detecting a first instance of network traffic that is consistent with criteria defined by at least one key included in a first set of keys of the plurality of sets of keys;
   identifying a first time value for the first instance of network traffic;
   identifying a first time range of the plurality of time ranges index in the model that is consistent with the first time value;
   calculating a first sketch from the first instance of network traffic; and
   updating the model with the first sketch at each location in the model indexed by each key of the at least one key and the first time range.

2. The computer-implemented method of claim 1, wherein the multiple criteria include first criteria defined by a first key of the first set of keys, and wherein the first criteria relates to a type of a computerized attack.

3. The computer-implemented method of claim 2, wherein the multiple criteria further include second, third, and fourth criteria defined by a second, third, and fourth key of the first set of keys, and wherein the first criteria relates to a source IP address of a computerized attack, the second criteria relates to a source IP port of the computerized attack, the third criteria relates to a destination IP address of the computerized attack, and the fourth criteria relates to a destination IP port of the computerized attack, the method further comprising detecting that the first instance of network traffic is also consistent with the second, third and fourth criteria.

4. The computer-implemented method of claim 1, wherein each set's keys define the same criteria except that each set includes at least one key that defines a time interval different than each of the other sets.

5. The computer-implemented method of claim 1, wherein the step of detecting a first instance of network traffic comprises detecting at least one alert from an engine, the alert being with respect to the first instance of network traffic.

6. The computer-implemented method of claim 5, wherein the multiple criteria relate to selected alerts received from a plurality of engines.

7. The computer-implemented method of claim 1, the method further comprising:
   detecting a second instance of network traffic that is consistent with the criteria defined by the at least one key;
   identifying a second time value for the detected second instance of network traffic;
   identifying that the second time value is consistent with the first time range;
   calculating a second sketch from the first sketch and the second instance of network traffic; and
   updating the model with the second sketch at each location in the model indexed by the at least one key and the first time range.

8. A computer-implemented method comprising:
   generating a model related to network traffic, wherein the model comprises values and is indexed by a plurality of keys and a plurality of time ranges, and each value comprises a sketch that approximates network traffic at a corresponding key of the plurality of keys and a corresponding time range of the plurality of time ranges, wherein each key defines different criteria of multiple criteria to be compared to the network traffic; and wherein each set of keys define criteria that include a time interval and a time amount, the time amount representing a multiple of the time interval, each multiple defining a different resolution of a time scale used by that set of keys;

displaying the model;

detecting a first instance of network traffic that is consistent with the criteria defined by at least one key of the plurality of keys;

identifying a first time value for the first instance of network traffic;

identifying a first time range of the plurality of time ranges index in the model that is consistent with the first time value;

calculating a first sketch from the first instance of network traffic; and updating the model with the first sketch at each location in the model indexed by each key of the at least one key and the first time range.

9. The computer-implemented method of claim 8, the method further comprising:

receiving a search criteria;

comparing the search criteria to the criteria defined by the at least one key; and identifying a sketch based on the comparison.

10. The computer-implemented method of claim 8, the method further comprising:

storing the model on a first computing device; and electronically communicating the first sketch to a second computing device.

11. The computer-implemented method of claim 8, wherein the plurality of keys comprises sets of keys, and wherein the multiple criteria further include first and second criteria defined by a first and second key of the sets of keys, wherein the first criteria relates to a source IP address of a computerized attack, the second criteria relates to a destination IP port of the computerized attack, the method further comprising detecting that the first instance of network traffic is also consistent with the first and second criteria.

12. The computer-implemented method of claim 8, wherein the plurality of keys comprises sets of keys, and wherein the multiple criteria further include first and second criteria defined by a first and second key of the sets of keys, wherein the first criteria relates to a source geographical area of a computerized attack, and the second criteria relates to a destination IP port of the computerized attack, the method further comprising detecting that the first instance of network traffic is also consistent with the first and second criteria.

13. The computer-implemented method of claim 12, wherein the source geographical area identifies a country.

14. The computer-implemented method of claim 12, wherein the multiple criteria further include a third criteria defined by a third key and the third criteria relates to a source IP address of the computerized attack, the method further comprising detecting that the first instance of network traffic is also consistent with the third criteria.

15. The computer-implemented method of claim 12, wherein the multiple criteria further include a third criteria defined by a third key and the third criteria relates to a type of the computerized attack, the method further comprising detecting that the first instance of network traffic is also consistent with the third criteria.

16. A computer-implemented method comprising:

generating a model related to network traffic, wherein the model comprises values and is indexed by a plurality of sets of keys and a plurality of time ranges, and each value comprises a sketch that approximates network traffic that is consistent with a key of the plurality of sets of keys and a time range of the plurality of time ranges, wherein each key within each set of keys defines different criteria of multiple criteria to be compared to the network traffic, wherein the keys in a first set of keys correspond to different time intervals per time range; and wherein each set of keys define criteria that include a time interval and a time amount, the time amount representing a multiple of the time interval, each multiple defining a different resolution of a time scale used by that set of keys;

displaying the model;

detecting a first instance of network traffic that is consistent with criteria defined by at least one key included in a first set of keys of the plurality of sets of keys;

identifying a first time value for the first instance of network traffic;

identifying a first time range of the plurality of time ranges index in the model that is consistent with the first time value;

calculating a first sketch from the first instance of network traffic; and updating the model with the first sketch at each location in the model indexed by each key of the at least one key and the first time range.

17. The computer-implemented method of claim 16, wherein a second key within a second set of keys defines second criteria of the multiple criteria to be compared to the network traffic, the method further comprising:

detecting a second instance of network traffic that is consistent with the second criteria;

identifying a second time value for the second instance of network traffic;

identifying a second time range consistent with the second time value;

calculating a second sketch from the second instance of network traffic; and updating the model with the second sketch at a location in the model indexed by the second set of keys and the first time range.

18. The computer-implemented method of claim 17, the method further comprising:

detecting a third instance of network traffic that is consistent with the first key's criteria;

identifying a third time value for the detected third instance of network traffic;

identifying that the third time value is consistent with the first time range;

calculating a third sketch from the first sketch and the third instance of network traffic; and updating the model with the third sketch at the location indexed by the first set of keys and the first time range.

19. The computer-implemented method of claim 18, wherein the first sketch comprises a probabilistic estimation of the first instance of network traffic.

* * * * *

UNITED STATES PATENT AND TRADEMARK OFFICE
CERTIFICATE OF CORRECTION

PATENT NO. : 9,578,046 B2
APPLICATION NO. : 14/405684
DATED : February 21, 2017
INVENTOR(S) : Michael Baker It is certified that error appears in the above-identified patent and that said Letters Patent is hereby corrected as shown below:

In the Claims

At Column 26, Claim number 1, Line 5, after "each multiple" add "of the time interval";

At Column 26, Claim number 1, Line 7, after "the model;" add "capturing at least one network packet in the network traffic; generating a metadata by extracting data from the at least one network packet; obtaining an analyzed metadata by inspecting the metadata for anomalies;";

At Column 26, Claim number 1, Line 8, after "network traffic" add "from the analyzed metadata";

At Column 26, Claim number 7, Line 51, after "network traffic" add "from the analyzed method";

At Column 27, Claim number 8, Line 5, after "wherein each" add "key of the plurality" and delete "set";

At Column 27, Claim number 8, Lines 7-8, after "multiple" add "of the time interval";

At Column 27, Claim number 8, Line 10, after "model;" add "capturing at least one network packet in the network traffic; generating a metadata by extracting data from the at least one network packet; obtaining an analyzed metadata by inspecting the metadata for anomalies;";

At Column 27, Claim number 8, Line 11, after "network traffic" add "from the analyzed metadata";

At Column 27, Claim number 10, Line 32, after "model" add "updated with the first sketch";

At Column 27, Claim number 10, Line 33, after "communicating the" add "model updated with the";

At Column 28, Claim number 16, Line 11, after "each set" add "of the plurality of sets";

Signed and Sealed this
Twenty-fifth Day of April, 2017

Michelle K. Lee
*Director of the United States Patent and Trademark Office*

CERTIFICATE OF CORRECTION (continued)
U.S. Pat. No. 9,578,046 B2

At Column 28, Claim number 16, Line 13, after "wherein" delete "the";

At Column 28, Claim number 16, Line 14, after "set" add "of the plurality of sets";

At Column 28, Claim number 16, Line 18, after "multiple" add "of the time interval";

At Column 28, Claim number 16, Line 20, after "model;" add "capturing at least one network packet in the network traffic; generating a metadata by extracting data from the at least one network packet; obtaining an analyzed metadata by inspecting the metadata for anomalies;";

At Column 28, Claim number 16, Line 21, after "network traffic" add "from the analyzed metadata";

At Column 28, Claim number 17, Line 35, after "set of keys" add "of the plurality of sets";

At Column 28, Claim number 17, Line 38, after "network traffic" add "from the analyzed metadata";

At Column 28, Claim number 18, Line 51, after "network traffic" add "from the analyzed metadata";

At Column 28, Claim number 18, Line 52, delete "first key's", and after "criteria" add "defined by the at least one key included in the first set of keys of the plurality of sets of keys";

At Column 28, Claim number 18, Line 59, after "third sketch at" delete "the".